(12) United States Patent
Hendrix et al.

(10) Patent No.: US 9,505,318 B2
(45) Date of Patent: Nov. 29, 2016

(54) ELECTRIC VEHICLE FLEET CHARGING SYSTEM

(75) Inventors: Walter M. Hendrix, Richardson, TX (US); Scott B. Hendrix, North Garden, VA (US)

(73) Assignee: Sierra Smart Systems, LLC, Richardson, TX (US)

( * ) Notice: Subject to any disclaimer, the term of this patent is extended or adjusted under 35 U.S.C. 154(b) by 0 days.

(21) Appl. No.: 13/481,572

(22) Filed: May 25, 2012

(65) Prior Publication Data

US 2012/0330494 A1 Dec. 27, 2012

Related U.S. Application Data

(60) Provisional application No. 61/490,233, filed on May 26, 2011.

(51) Int. Cl.
*B60L 11/18* (2006.01)

(52) U.S. Cl.
CPC ........ *B60L 11/1838* (2013.01); *B60L 11/1825* (2013.01); *B60L 11/1848* (2013.01); *B60L 11/1851* (2013.01); *B60L 11/1861* (2013.01); *B60L 2230/16* (2013.01); *B60L 2240/12* (2013.01); *B60L 2250/20* (2013.01);
(Continued)

(58) Field of Classification Search
CPC .............. B60L 11/1838; B60L 11/1816; B60L 8/00; G07C 5/008; G06Q 10/06; G06Q 20/102; G05B 23/0235; F03D 9/007; H04L 12/28; B60K 6/445; G01D 4/002

USPC .............. 701/29.3, 454, 31.4; 320/103, 109; 191/2; 429/34, 513; 307/10.1, 72, 31; 705/14.54; 700/291

See application file for complete search history.

(56) References Cited

U.S. PATENT DOCUMENTS

| | | | |
|---|---|---|---|
| 2005/0052080 A1* | 3/2005 | Maslov | B60L 8/00 307/10.1 |
| 2005/0096809 A1* | 5/2005 | Skeen | G07C 5/008 701/31.4 |

(Continued)

FOREIGN PATENT DOCUMENTS

DE 102009024721 A1 * 12/2010

*Primary Examiner* — Yuri Kan
(74) *Attorney, Agent, or Firm* — Kirby B. Drake; Klemchuk LLP

(57) ABSTRACT

An electric vehicle charging system comprises one or more system power and control modules (SPCM) and vehicle charging stations (VCS); wherein the SPCM distributes power from a power source to the VCS, and the VCS distributes power to one or more electric vehicles. Another electric vehicle charging system comprises an SPCM, VCS, a fleet management system (FMS) for monitoring and controlling the charging system, and a communications network for sharing information. A system for managing a plurality of electric vehicles comprises a plug-in module configured to collect and store information from an on-board diagnostics system of at least one of the plurality of electric vehicles, management software, a communications network, and a smart device software application for displaying system information. A computer-readable medium having computer-executable instructions for supporting a management system for a plurality of electric vehicles to extract, organize, and display information from the management system.

19 Claims, 42 Drawing Sheets

(52) U.S. Cl.
CPC ........... *Y02T 10/705* (2013.01); *Y02T 10/7005* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2006/0052918 A1* | 3/2006 | McLeod et al. | 701/29 |
| 2008/0004764 A1* | 1/2008 | Chinnadurai | G05B 23/0235 701/31.4 |
| 2009/0096416 A1* | 4/2009 | Tonegawa | B60K 6/445 320/109 |
| 2009/0246596 A1* | 10/2009 | Sridhar | B60L 11/1816 429/513 |
| 2010/0207453 A1* | 8/2010 | Ottman | 307/72 |
| 2010/0274404 A1* | 10/2010 | Holbery | G01D 4/002 700/291 |
| 2011/0301807 A1* | 12/2011 | Staaf | G06Q 10/06 701/29.3 |
| 2012/0001487 A1* | 1/2012 | Pessina | H04L 12/28 307/31 |
| 2012/0013301 A1* | 1/2012 | Gaul et al. | 320/109 |
| 2012/0112696 A1* | 5/2012 | Ikeda | B60L 11/1816 320/109 |
| 2012/0181985 A1* | 7/2012 | Lowenthal | B60L 11/1816 320/109 |
| 2012/0229082 A1* | 9/2012 | Vukojevic et al. | 320/108 |
| 2013/0124320 A1* | 5/2013 | Karner | G06Q 20/102 705/14.54 |

\* cited by examiner

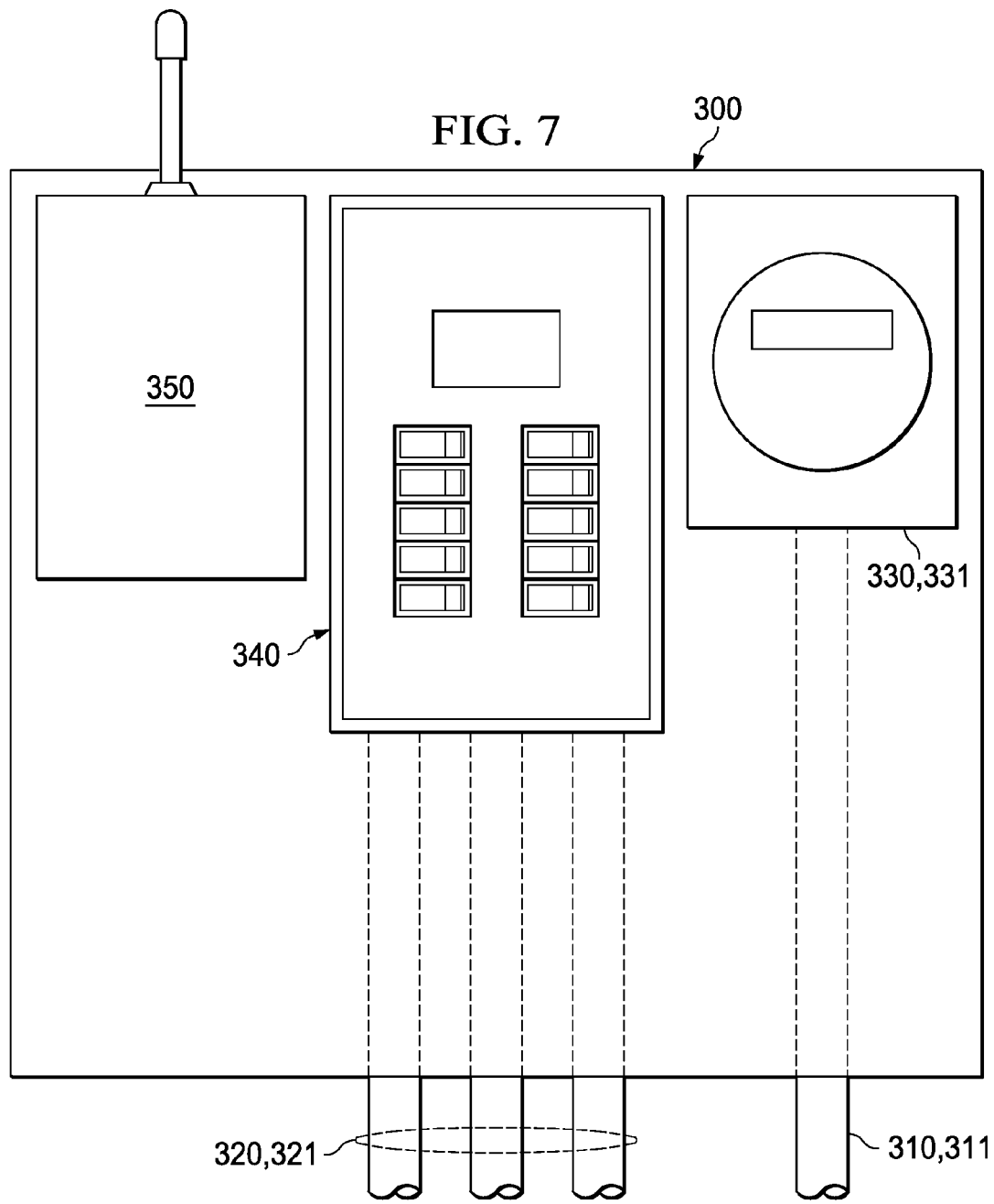

FIG. 12
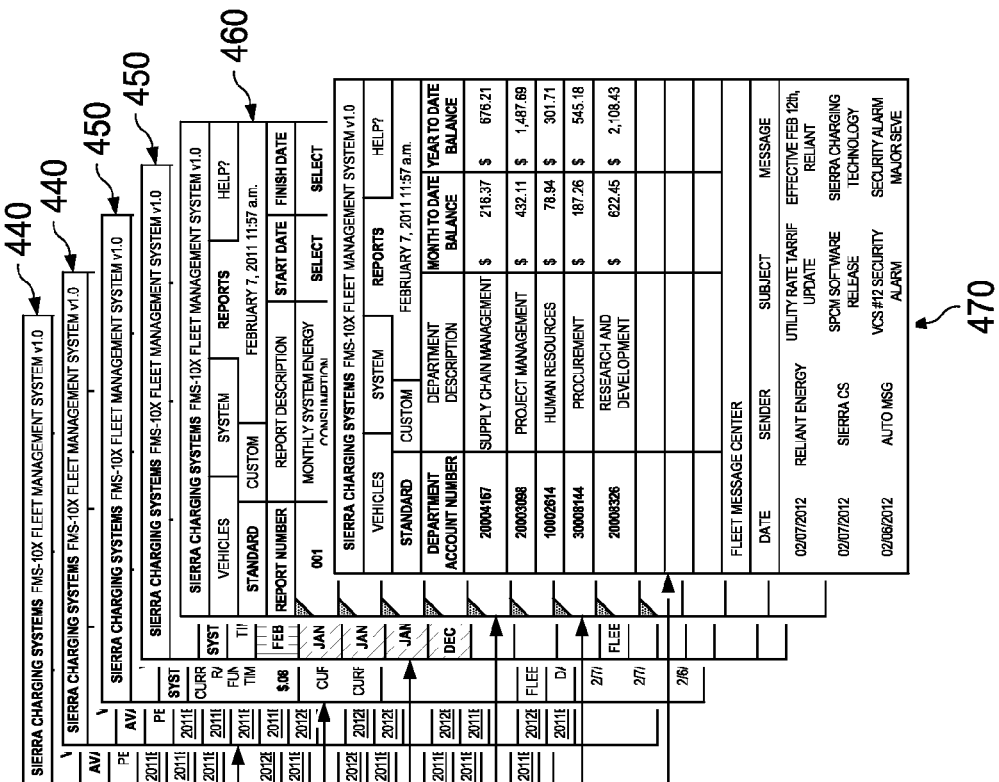
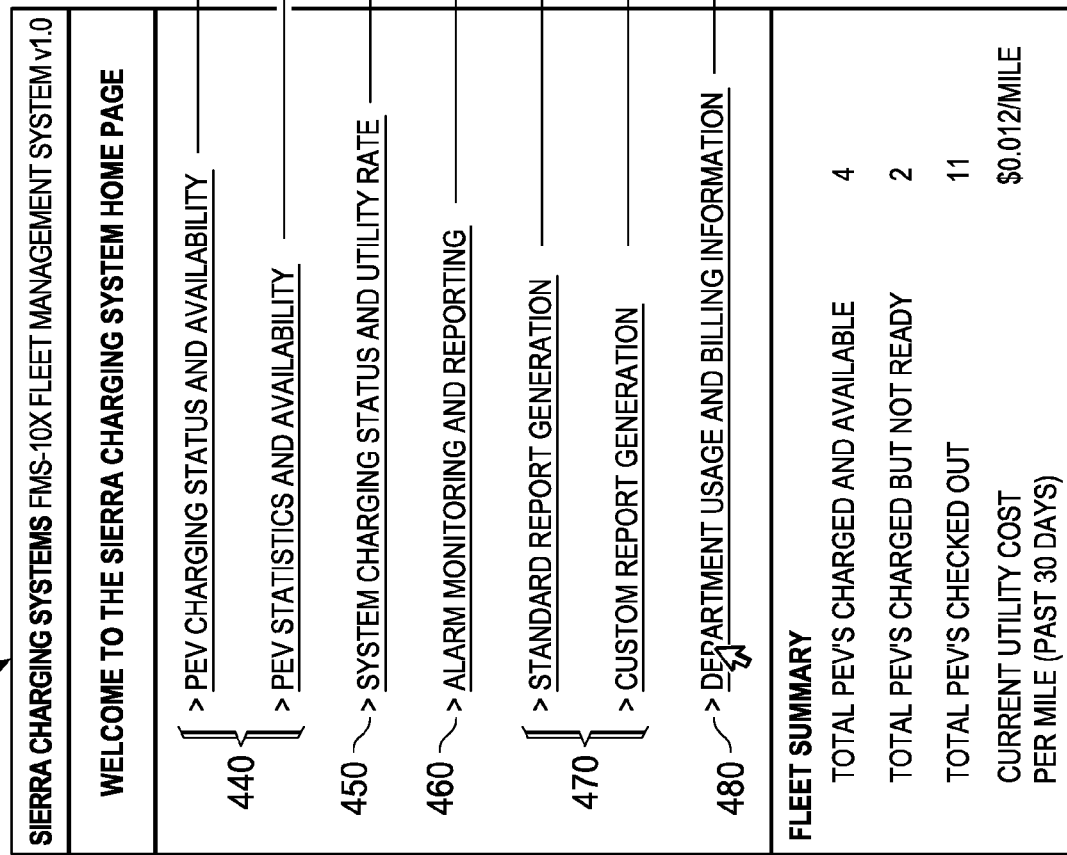

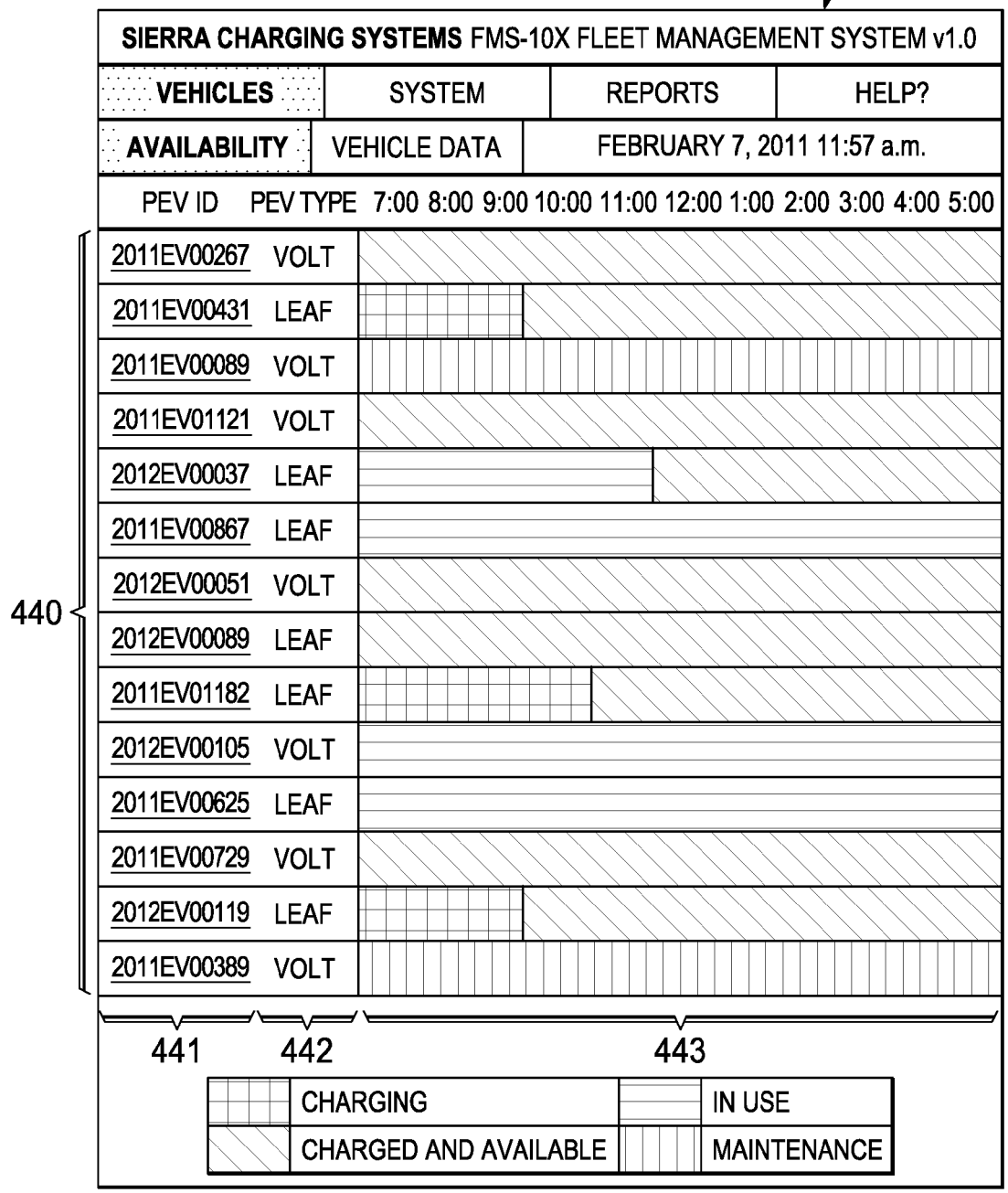

| SIERRA CHARGING SYSTEMS FMS-10X FLEET MANAGEMENT SYSTEM v1.0 |||||
|---|---|---|---|---|
| VEHICLES || SYSTEM | REPORTS | HELP? |
| AVAILABILITY || VEHICLE DATA | FEBRUARY 7, 2011 11:57 a.m. ||
| PEV ID | PEV TYPE | ODOMETER MILES | NUMBER CHARGE CYCLES | MAINTENANCE DUE |
| 2011EV00267 | VOLT | 35,236 | 75 | NOV-12 |
| 2011EV00431 | LEAF | 43,116 | 462 | NOV-12 |
| 2011EV00089 | VOLT | 24,777 | 98 | FEB-12 |
| 2011EV01121 | VOLT | 18,559 | 562 | MAR-12 |
| 2012EV00037 | LEAF | 3,218 | 43 | JUN-12 |
| 2011EV00867 | LEAF | 16,228 | 192 | DEC-12 |
| 2012EV00051 | VOLT | 5,287 | 65 | APR-12 |
| 2012EV00089 | LEAF | 7,113 | 89 | MAY-12 |
| 2011EV01182 | LEAF | 12,596 | 431 | JUL-12 |
| 2012EV00105 | VOLT | 2,964 | 23 | SEP-12 |
| 2011EV00625 | LEAF | 14,378 | 335 | AUG-12 |
| 2011EV00729 | VOLT | 19,268 | 627 | AUG-12 |
| 2012EV00119 | LEAF | 4,825 | 114 | SEP-13 |
| 2011EV00389 | VOLT | 21,065 | 529 | FEB-12 |

440 (left bracket around vehicle rows)

444  445  446

| CHARGING | IN USE |
|---|---|
| CHARGED AND AVAILABLE | MAINTENANCE |

FIG. 14a

SIERRA CHARGING SYSTEMS FMS-10X FLEET MANAGEMENT SYSTEM v1.0

| VEHICLES | SYSTEM | REPORTS | HELP? |
|---|---|---|---|

| AVAILABILITY | VEHICLE DATA | FEBRUARY 7, 2011 11:57 a.m. | |
|---|---|---|---|

410

| PEV ID | PEV TYPE | ODOMETER MILES 444 | NUMBER CHARGE CYCLES 445 | MAINTENANCE DUE 446 |
|---|---|---|---|---|
| 2011EV00267 | VOLT | 35,236 | 75 | NOV-12 |
| 2011EV00431 | LEAF | 43,116 | 462 | NOV-12 |
| 2011EV00089 | VOLT | 24,777 | 98 | FEB-12 |
| 2011EV01121 | VOLT | 18,559 | 562 | MAR-12 |
| 2012EV00037 | LEAF | 3,218 | 43 | JUN-12 |
| 2011EV00867 | LEAF | 16,228 | 192 | DEC-12 |
| 2012EV00051 | VOLT | 5,287 | 65 | APR-12 |
| 2012EV00089 | LEAF | 7,113 | 89 | MAY-12 |
| 2011EV01182 | LEAF | 12,596 | 431 | JUL-12 |
| 2012EV00105 | VOLT | 2,964 | 23 | SEP-12 |
| 2011EV00625 | LEAF | 14,378 | 335 | AUG-12 |
| 2011EV00729 | VOLT | 19,268 | 627 | AUG-12 |
| 2012EV00119 | LEAF | 4,825 | 114 | SEP-13 |
| 2011EV00389 | VOLT | 21,065 | 529 | FEB-12 |

440

| CHARGING | CHARGED AND AVAILABLE | IN USE | MAINTENANCE |
|---|---|---|---|

SIERRA CHARGING SYSTEMS FMS-10X FLEET MANAGEMENT SYSTEM v1.0

PEV TYPE: 2012 CHEVY VOLT
PEV ID: 2012EV00051
LOCATION: APOLLO RD STATION, RICHARDSON, TX
CHARGE STATUS: COMPLETE
PARKING SPACE: A27

| FIG. 14b-1 | FIG. 14b-2 |

FIG. 14b-1 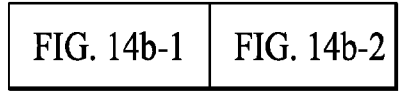

SIERRA CHARGING SYSTEMS FMS-10X FLEET MANAGEMENT SYSTEM v1.0

| VEHICLES | SYSTEM | REPORTS | HELP? |
|---|---|---|---|
| AVAILABILITY | VEHICLE DATA | FEBRUARY 7, 2011 11:57 a.m. | |

| PEV ID | PEV TYPE | ODOMETER MILES 444 | NUMBER CHARGE CYCLES 445 | MAINTENANCE DUE 446 |
|---|---|---|---|---|
| 2011EV00267 | VOLT | 35,236 | 75 | NOV-12 |
| 2011EV00431 | LEAF | 43,116 | 462 | NOV-12 |
| 2011EV00089 | VOLT | 24,777 | 98 | FEB-12 |
| 2011EV01121 | VOLT | 18,559 | 562 | MAR-12 |
| 2012EV00037 | LEAF | 3,218 | 43 | JUN-12 |
| 2011EV00867 | LEAF | 16,228 | 192 | DEC-12 |
| 2012EV00051 | VOLT | 5,287 | 65 | APR-12 |
| 2012EV00089 | LEAF | 7,113 | 89 | MAY-12 |
| 2011EV01182 | LEAF | 12,596 | 431 | JUL-12 |
| 2012EV00105 | VOLT | 2,964 | 23 | SEP-12 |
| 2011EV00625 | LEAF | 14,378 | 335 | AUG-12 |
| 2011EV00729 | VOLT | 19,268 | 627 | AUG-12 |
| 2012EV00119 | LEAF | 4,825 | 114 | SEP-13 |
| 2011EV00389 | VOLT | 21,065 | 529 | FEB-12 |

| CHARGING | CHARGED AND AVAILABLE | IN USE | MAINTENANCE |

| SIERRA CHARGING SYSTEMS FMS-10X FLEET MANAGEMENT SYSTEM v1.0 ||||
|---|---|---|---|
| VEHICLES | SYSTEM | REPORTS | HELP? |
| AVAILABILITY | VEHICLE DATA | FEBRUARY 7, 2011 11:57 a.m. ||
| PEV ID | PEV TYPE | ODOMETER MILES | NUMBER CHARGE CYCLES | MAINTENANCE DUE |
| 2011EV00267 | VOLT | 35,236 | 75 | NOV-12 |

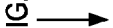

| ON BOARD DIAGNOSTIC DATA | MINIMUM VALUE | MAXIMUM VALUE | UNITS |
|---|---|---|---|
| MOTOR RPM | 0 | 5478 | RPM |
| VEHICLE SPEED | 0 | 84 | MPH |
| TOTAL MILEAGE | - | 17,722 | MILES |
| AMBIENT TEMPERATURE | 16 | 62 | DEGREES FAHRENHEIT |
| RUN TIME SINCE LAST PM | - | 11,428 | HOURS |
| DISTANCE TRAVELED WITH FAULT | - | 4,239 | MILES |
| NUMBER OF CHARGE CYCLES | - | 784 | CYCLES |
| DEPTH OF BATTERY DISCHARGE | 0 | 74 | % |
| MAX RANGE PER CHANGE | - | 86 | MILES |
| BATTERY TEMPERATURE | 17 | 72 | DEGREES FAHRENHEIT |
| DISCHARGE CURRENT | - | 124.0 | AMPS |
| CHARGE CURRENT | - | 25.6 | AMPS |
| RECHARGE TIME | 2.4 | 5.9 | HOURS |
| CONSUMPTION PER MILE | 0.93 | 1.64 | KILOWATT-HOUR / MILE |
| OPERATING VOLTAGE | 224 | 393.0 | VOLTS DC |
| SELF DISCHARGE RATE | 38 | 122 | WATT-HOURS / DAY |
| PEV ON BOARD (OBD-II) DIAGNOSTIC DATA ||||

| SIERRA CHARGING SYSTEMS FMS-10X FLEET MANAGEMENT SYSTEM v1.0 ||||| 
|---|---|---|---|---|
| VEHICLES | SYSTEM || REPORTS | HELP? |
| SYSTEM STATUS | MONITORING || FEBRUARY 7, 2011 11:57 a.m. ||
| TIME/DATE | SEVERITY | LOCATION | ALARM DESCRIPTION | STATUS |
| FEB 7 11:57am | MAJOR | VCS #4 | SECURITY VIOLATION - INTRUSION ALERT | OPEN |
| JAN 21 2:56pm | MINOR | VCS #14 | COMMUNICATION FAILURE - RFID FAIL | RESOLVED |
| JAN 14 1:23pm | MINOR | VCS #2 | COMMUNICATION FAILURE - RFID FAIL | RESOLVED |
| JAN 2 4:29pm | MAJOR | VCS #9 | SECURITY VIOLATION - INTRUSION ALERT | RESOLVED |
| DEC 21 11:57am | MAJOR | SPCM #1 | SECURITY VIOLATION - INTRUSION ALERT | RESOLVED |
| | | | | |
| | | | | |
| | | | | |
| FLEET ALARM SUMMARY |||||
| TOTAL ACTIVE ALARMS: 1 |||||
| TOTAL MAJOR ALARMS: 1 |||||
| TOTAL MINOR ALARMS: 0 |||||
| HIGHEST FREQUENCY ALARM (PAST SIX MONTHS): SECURITY VIOLATION - INTRUSION ALERT |||||
| |||||

FIG. 17

| SIERRA CHARGING SYSTEMS FMS-10X FLEET MANAGEMENT SYSTEM v1.0 ||||
|---|---|---|---|
| VEHICLES | SYSTEM | REPORTS | HELP? |
| STANDARD | CUSTOM | FEBRUARY 7, 2011 11:57 a.m. ||
| REPORT NUMBER | REPORT DESCRIPTION | START DATE | FINISH DATE |
| 001 | MONTHLY SYSTEM ENERGY CONSUMPTION | SELECT | SELECT |
| 002 | MONTHLY PEAK DEMAND HOURS CHARGED | SELECT | SELECT |
| 003 | WEEKLY SYSTEM ENERGY CONSUMPTION | SELECT | SELECT |
| 004 | WEEKLY PEAK DEMAND HOURS CHARGED | SELECT | SELECT |
| 005 | MONTHLY ENERGY CONSUMED PER VEHICLE | SELECT | SELECT |
| 006 | MONTHLY ENERGY CONSUMED PER DRIVER | SELECT | SELECT |
| 007 | MONTHLY TOTAL ENERGY COST | SELECT | SELECT |
| 008 | WEEKLY TOTAL ENERGY COST | SELECT | SELECT |
| 009 | MONTHLY TOTAL ENERGY RETURNED TO GRID | SELECT | SELECT |
| | | | |
| | | | |
| | GENERATE REPORT | | |

FIG. 18a

| FIG. 18a-1 | FIG. 18a-2 |

FIG. 18a-1

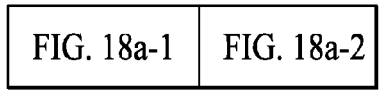

| SIERRA CHARGING SYSTEMS FMS-10X FLEET MANAGEMENT SYSTEM v1.0 |
|---|
| WELCOME TO THE SIERRA CHARGING SYSTEM HOME PAGE |

> PEV CHARGING STATUS AND AVAILABILITY

> PEV STATISTICS AND AVAILABILITY

> SYSTEM CHARGING STATUS AND UTILITY RATE

> ALARM MONITORING AND REPORTING

> STANDARD REPORT GENERATION

> CUSTOM REPORT GENERATION

> DEPARTMENT USAGE AND BILLING INFORMATION

TO FIG. 18a(2)

FLEET SUMMARY

| TOTAL PEV'S CHARGED AND AVAILABLE | 4 |
| TOTAL PEV'S CHARGED BUT NOT READY | 2 |
| TOTAL PEV'S CHECKED OUT | 11 |
| CURRENT UTILITY COST PER MILE (PAST 30 DAYS) | $0.012/MILE |

FIG. 18a-2

| SIERRA CHARGING SYSTEMS FMS-10X FLEET MANAGEMENT SYSTEM v1.0 ||||
|---|---|---|---|
| VEHICLES | SYSTEM | REPORTS | HELP? |
| STANDARD | CUSTOM | FEBRUARY 7, 2011 11:57 a.m. ||
| DEPARTMENT ACCOUNT NUMBER | DEPARTMENT DESCRIPTION | MONTH TO DATE BALANCE | YEAR TO DATE BALANCE |
| 20004167 | SUPPLY CHAIN MANAGEMENT | $ 216.37 | $ 676.21 |
| 20003098 | PROJECT MANAGEMENT | $ 432.11 | $ 1,487.69 |
| 10002614 | HUMAN RESOURCES | $ 78.94 | $ 301.71 |
| 30008144 | PROCUREMENT | $ 187.26 | $ 545.18 |
| 20008326 | RESEARCH AND DEVELOPMENT | $ 622.45 | $ 2,108.43 |
|  |  |  |  |
|  |  |  |  |
|  |  |  |  |

} 480

| FLEET MESSAGE CENTER ||||
|---|---|---|---|
| DATE | SENDER | SUBJECT | MESSAGE |
| 2/7/2012 | RELIANT ENERGY | UTILITY RATE TARRIF UPDATE | EFFECTIVE FEB 12th, RELIANT |
| 2/7/2012 | SIERRA CS | SPCM SOFTWARE RELEASE | SIERRA CHARGING TECHNOLOGY |
| 2/6/2012 | AUTO MSG | VCS #12 SECURITY ALARM | SECURITY ALARM MAJOR SEVE |

FROM FIG. 18a(1)

FIG. 24b    410

| SIERRA CHARGING SYSTEMS FMS-10X FLEET MANAGEMENT SYSTEM v1.0 |||||
|---|---|---|---|---|
| VEHICLES | SYSTEM || REPORTS | HELP? |
| SYSTEM STATUS | MONITORING || FEBRUARY 7, 2011 11:57 a.m. ||

| CURRENT UTILITY RATE AS A FUNCTION OF TIME OF USE:<br>$.08 PER Kw-hr | 451<br>.12<br>.10<br>.08<br>.06<br>2am 4am 6am 8am 10am 12pm 2pm 4pm 6pm 8pm 10pm 12am<br>[chart with PEAK DEMAND RATE] |
|---|---|

AVAILABLE BATTERY RESERVE AND V2G OPERATION SETTINGS

| SYSTEM OPERATING PARAMETERS ||
|---|---|
| CURRENT TOTAL ELECTRICITY DEMAND (OR SUPPLY TO GRID) BY SYSTEM | 6.8 Kw |
| CURRENT TOTAL BATTERY RESERVES AVAILABLE FOR SUPPLY TO GRID | 16.2 Kw-hr |
| MINIMUM BATTERY CHARGE LEVEL SETTING TO ALLOW V2G OPERATION: | 75% |
| ALLOW PEV CHARGED BATTERIES TO SUPPORT V2G OPERATION (YES OR NO): | YES |

| CUSTOMIZED CHARGING PROFILE ||
|---|---|
| ALLOW CHARGING DURING PEAK DEMAND RATE: | ☐YES ☒NO |
| AUTO SKIP PEAK DEMAND CHARGING UNLESS USER OVERRIDES: | ☒YES ☐NO |
| AUTO SKIP TO MINIMUM UTILITY RATE UNLESS USER OVERRIDES: | ☒YES ☐NO |

| FLEET MESSAGE CENTER ||||
|---|---|---|---|
| DATE | SENDER | SUBJECT | MESSAGE |
| 2/7/2012 | RELIANT ENERGY | UTILITY RATE TARRIF UPDATE | EFFECTIVE FEB 12th, RELIANT |
| 2/7/2012 | SIERRA CS | SPCM SOFTWARE RELEASE | SIERRA CHARGING TECHNOLOGY |
| 2/6/2012 | AUTO MSG | VCS #12 SECURITY ALARM | SECURITY ALARM MAJOR SEVE |

| STEP | STEP DESCRIPTION | ACTION TYPE | INPUT | OUTPUT |
|---|---|---|---|---|
| 1 | FROM FMS SET MINIMUM BATTERY CHARGE LEVEL REQUIRED TO SUPPORT V2G OPERATION | FMS GUI INPUT BY FLEET MANAGER | 85% | |
| 2 | FROM FMS SET THE DRAINED BATTERY CHARGE LEVEL AT WHICH V2G OPERATION WILL BE STOPPED | FMS GUI INPUT BY FLEET MANAGER | 40% | |
| 3 | IS THE V2G SYSTEM OPTION PRESENT AND SHOULD IT BE UTILIZED? | FMS GUI INPUT BY FLEET MANAGER | YES OR NO | |
| 4 | IF #3 RESPONSE IS NO, END QUERY AND INHIBIT V2G OPERATION | SYSTEM HARDWARE/ SOFTWARE ACTION | | STOP V2G OPERATION |
| 5 | IF #3 RESPONSE IS YES, WILL V2G CAPABILITY BE USED TO REDUCE PEAK TIME OF DAY CONSUMPTION? | FMS GUI INPUT BY FLEET MANAGER | YES OR NO | |
| 6 | IF #5 RESPONSE IS YES, WHAT TIME OF DAY WILL BE SPECIFIED AS PEAK? | FMS GUI INPUT BY FLEET MANAGER | 3:30pm-6:30pm M-F | |
| 7 | IF #3 RESPONSE IS YES, WILL V2G CAPABILITY BE USED TO PROVIDE ENERGY BACK UP POWER? | FMS GUI INPUT BY FLEET MANAGER | YES OR NO | |
| 8 | POLL ALL VCS IN SYSTEM TO DETERMINE NUMBER OF PEV'S CONNECTED TO CHARGER (VCS) | SYSTEM HARDWARE/ SOFTWARE ACTION | | 14 PEV'S |
| 9 | IDENTIFY VCS/PEV'S THAT MEET REQUIRED CHARGE LEVEL AND CAN BE USED FOR V2G OPERATION | SYSTEM HARDWARE/ SOFTWARE ACTION | | 9 PEV'S |
| 10 | SUM BATTERY RESERVE CAPACITY FOR PEV'S THAT MEETS CHARGE LEVEL REQUIREMENT | SYSTEM HARDWARE/ SOFTWARE ACTION | | 72 Kw-hr |
| 11 | BASED ON THE TIME OF DAY FROM #6, IS CURRENT TIME OF DAY WITHIN THE SPECIFIED PEAK TIME? | SYSTEM HARDWARE/ SOFTWARE ACTION | | YES OR NO |
| 12 | IF #11 RESPONSE IS YES, INITIATE V2G OPERATION FOR PEV'S HAVING SUFFICIENT BATTERY RESERVE | SYSTEM HARDWARE/ SOFTWARE ACTION | | INITIATE V2G OPERATION |
| 13 | IF CHARGE LEVEL FOR A PEV DROPS TO < SETTING OF #2 DURING V2G OPERATION, STOP V2G FOR THAT PEV | SYSTEM HARDWARE/ SOFTWARE ACTION | | STOP V2G FOR A PEV |
| 14 | IF #5 RESPONSE IS YES AND TIME OF DAY IS OUT OF SPECIFIED PEAK RANGE, STOP V2G OPERATION | SYSTEM HARDWARE/ SOFTWARE ACTION | | STOP V2G OPERATION |
| 15 | IF #7 RESPONSE IS YES, STATE IF THERE IS CURRENTLY AN AC POWER FAIL ALARM? | SYSTEM HARDWARE/ SOFTWARE ACTION | | YES OR NO |
| 16 | IF #15 RESPONSE IS YES, INITIATE V2G OPERATION FOR PEV'S WITH SUFFICIENT BATTERY RESERVE | SYSTEM HARDWARE/ SOFTWARE ACTION | | INITIATE V2G OPERATION |
| 17 | CHECK AC POWER STATUS EVERY 5 MSEC, IF AC POWER FAIL ALARM RESOLVES, STOP V2G OPERATION | SYSTEM HARDWARE/ SOFTWARE ACTION | | STOP V2G OPERATION |

ELECTRIC VEHICLE FLEET CHARGING SYSTEM

CROSS REFERENCE TO RELATED APPLICATION

The present application claims the benefit under 35 U.S.C. §119(e) of the U.S. Provisional Application Ser. No. 61/490,233 filed May 26, 2011 and entitled "Plug-In Electric Vehicle Fleet Charging System," incorporated herein by reference for all purposes.

FIELD OF THE DISCLOSURE

The present disclosure generally relates to electric vehicles, and more particularly, to a system for charging electric vehicles.

BACKGROUND

Sales of electric vehicles are expected to grow rapidly over the next five years and beyond. Established market research indicates that by 2020, electric vehicles will represent approximately 6% of new light vehicle sales in the United States (roughly 1 million vehicles). By 2020, electric vehicles will be integrated into a smart grid power distribution system, and by 2030, electric vehicles could represent 20% of new light vehicle sales in the United States. A charging system infrastructure must be deployed throughout the United States and globally to support this growth. Efficient and effective infrastructure must include leading edge communication techniques and feature fleet management capability.

SUMMARY

Embodiments of the present disclosure generally provide systems for charging and managing a plurality of electric vehicles.

The present disclosure may be directed to a system for managing a plurality of electric vehicles comprising a plug-in module for connecting to an on-board diagnostics system of at least one of the plurality of electric vehicles, the plug-in module configured to collect and store data about the at least one of the plurality of electric vehicles; management software configured to monitor and control charging of two or more of the plurality of electric vehicles; a software application for execution on a smart device, the software application comprising a user interface for displaying system information; and a communications network for sharing information across the system, the communications network having a first communications link between the plug-in module and the management software, a second communications link between the management software and the smart device, and a third communications link between the smart device and the plug-in module. In various embodiments, the first, second, and third communications links may communicate wirelessly.

In an embodiment, the plug-in module may transmit the data about the at least one of the plurality of electric vehicles to the smart device via the third communications link. In another embodiment, the third communications link may comprise a WiFi connection.

In an embodiment, the plug-in module may transmit the vehicle data to the management software via the first communications link. In another embodiment, the first communications link may comprise a 3G/4G connection. In yet another embodiment, the first communications link may comprise a WiFi connection segment between the plug-in module and a local wireless network, and an internet connection segment between the local wireless network and the management software.

In an embodiment, the management software may transmit charging information to the smart device via the second communications link. In another embodiment, the second communications link may comprise a wireless 3G/4G connection.

In various embodiments, the data collected and stored by the plug-in module may be selected from a group consisting of: vehicle odometer reading, vehicle speed, battery charge level, and driver handling data. In an embodiment, the plug-in module may collect and store data about the at least one of the plurality of electric vehicles according to a selected schedule.

In an embodiment, the system information displayed by the software application may be selected from a group consisting of: availability of one or more electric vehicles; location of one or more available electric vehicles in close proximity to the smart device; distance to one or more electric vehicles; charge status of one or more electric vehicles; energy cost of one or more proximate electric vehicles; scheduled maintenance for one or more electric vehicles; and usage and handling metrics for a driver of one or more electric vehicles.

In yet another aspect, the present disclosure may be directed to a computer-readable medium adapted to store computer-executable instructions for supporting a management system for a plurality of electric vehicles, wherein the computer-executable instructions may comprise computer code to extract information from the management system about at least one characteristic of one or more of the plurality of electric vehicles, organize the information into a desired format, and may display the information via a user interface. In various embodiments, the computer-executable instructions may be executable on a smart device.

In an embodiment, the instructions to display the information may be configured to display a summary of availability and charge status of one or more of the plurality of electric vehicles. In another embodiment, the instructions to display the information may be configured to create a scrollable display of objects, each object identifying location and charge status of the one or more of the plurality of electric vehicles.

In various embodiments, the computer-executable instructions may further comprise computer code to calculate performance, mileage, and maintenance data for the one or more of the plurality of electric vehicles. In an embodiment, the computer-executable instructions may further comprise computer code to display administrative and driver history data for a driver of one or more of the plurality of electric vehicles.

In various embodiments, the information to be extracted from the management system may be collected and stored by a plug-in module for connecting to an on-board diagnostics system of the one or more of the plurality of electric vehicles. In an embodiment, the information to be extracted from the management system may be selected from the group consisting of: odometer reading, battery charge level, alarm status, maintenance alerts, and driver handling data.

In an embodiment, the information to be extracted from the management system may comprise electricity usage and rate data for the one or more of the plurality of electric vehicles. In various embodiments, the computer-executable instructions may further comprise code to calculate energy usage metrics for the one or more of the plurality of electric vehicles. In an embodiment, the energy usage metrics may be selected from the group consisting of: energy cost per mile, carbon emission reductions, and average miles driven between charges.

In an embodiment, the computer-executable instructions may further comprise computer code to calculate carbon emission reductions associated with at least one driver of the one or more of the plurality of electric vehicles. In another embodiment, the computer-executable instructions may further comprise computer code to calculate carbon emission reductions and percent of charging energy used at peak time energy cost by one or more of the plurality of electric vehicles.

In an embodiment, the computer-executable instructions may further comprise computer code to receive physical location data determined by the smart device. In another embodiment, the computer-executable instructions may further comprise computer code to calculate distance and direction from the smart device to the one or more of the plurality of electric vehicles.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 7 depicts a perspective view of a system power and control module according to an embodiment of the present disclosure;

FIG. 12 depicts an illustrative view of possible fleet management user interface displays according to an embodiment of the present disclosure;

FIG. 13a depicts an illustrative view of a fleet management user interface display directed to vehicle information according to an embodiment of the present disclosure;

FIG. 13b depicts an illustrative view of another fleet management user interface display directed to vehicle information according to an embodiment of the present disclosure;

FIG. 14a depicts an illustrative view of a fleet management user interface display directed to showing vehicle location on a map according to an embodiment of the present disclosure;

FIG. 14b depicts an illustrative view of another fleet management user interface display directed to vehicle diagnostic information according to an embodiment of the present disclosure;

FIG. 16 depicts an illustrative view of a possible fleet management user interface display for monitoring and reporting system alarms according to an embodiment of the present disclosure;

FIG. 17 depicts an illustrative view of a possible fleet management user interface display directed to generating system reports according to an embodiment of the present disclosure;

FIG. 18 depicts an illustrative view of a possible fleet management user interface display directed to accessing usage and billing information according to an embodiment of the present disclosure;

FIG. 24b depicts an illustrative view of a fleet management user interface display directed to providing relevant power and performance information for vehicle-to-grid operations according to an embodiment of the present disclosure;

FIG. 28a depicts logic for providing optimal load balancing and rotation of charge cycles as a function of utility tariffs, grid demand, and fleet demand according to an embodiment of the present disclosure;

DETAILED DESCRIPTION

Embodiments of the present disclosure generally provide an electric vehicle charging system. As described herein, the charging system may be used to monitor, control, and provide for the distribution of electrical power from a power source to electric vehicles. In various embodiments, the system delivers power to charge electric vehicles. In an embodiment, the system provides for managing the charging of a fleet of electric vehicles. In another embodiment, the system provides for optimizing power consumption and costs associated with vehicle charging and usage. In yet another embodiment, the system allows a user to reserve and check out an electric vehicle from a fleet of electric vehicles.

FIGS. 1-28b illustrate representative configurations of electric vehicle charging system 100 and parts thereof. It should be understood that the components of electric vehicle charging system 100 and parts thereof shown in FIGS. 1-28b are for illustrative purposes only, and that any other suitable components or subcomponents may be used in conjunction with or in lieu of the components comprising electric vehicle charging system 100 and the parts of electric vehicle charging system 100 described herein.

The present disclosure is directed to an electric vehicle charging system 100 capable of monitoring, controlling, and providing for the distribution of electrical power from a power source to an electric vehicle.

High Level Description

Figure 1:
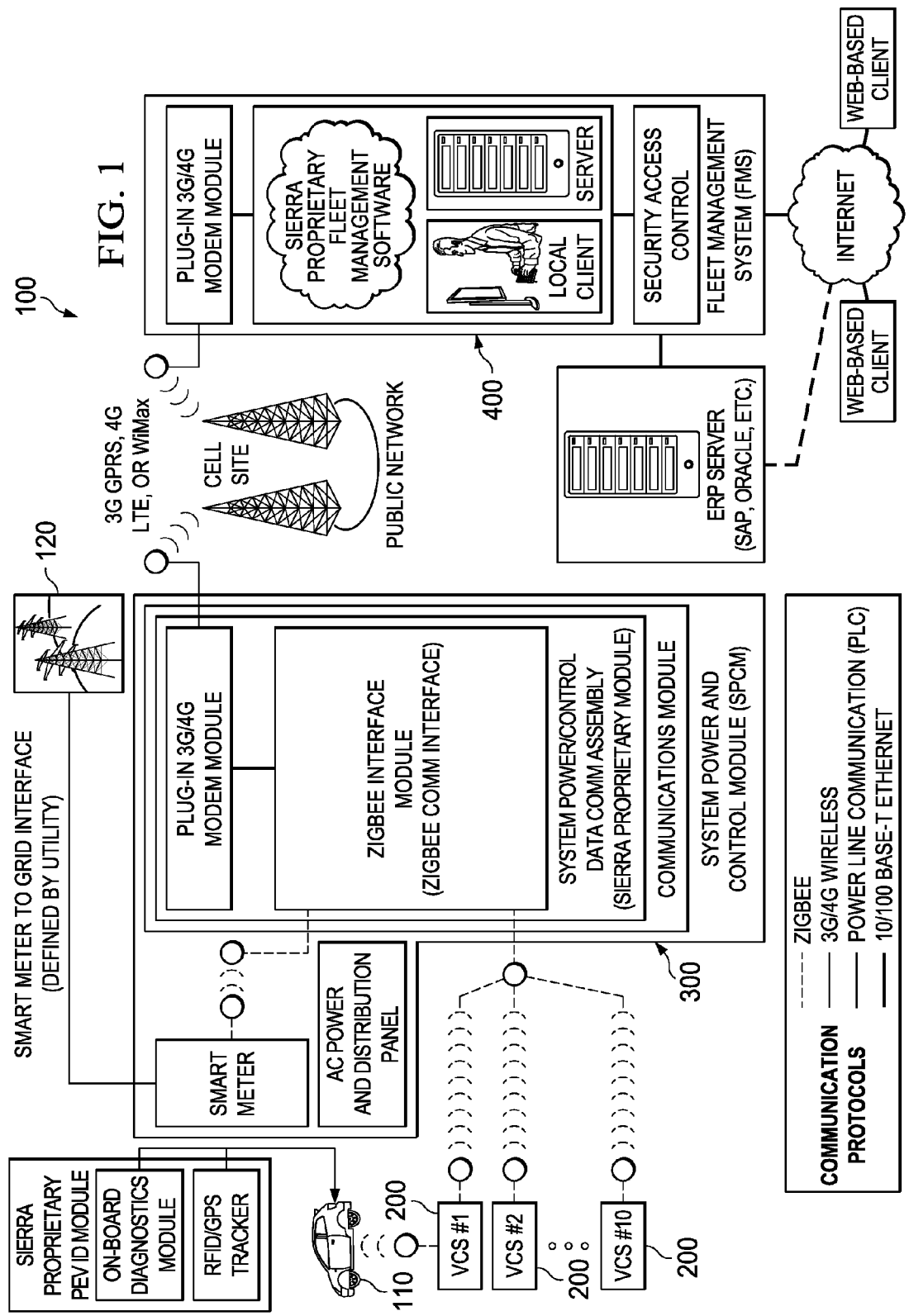
FIG. 1 depicts a schematic view of electric vehicle charging system according to an embodiment of the present disclosure.

FIG. 1 schematically depicts an embodiment of electric vehicle charging system 100. The electric vehicle charging system 100 may generally comprise a plurality of Vehicle Charging Stations 200, one or more System Power and Control Module 300, and a Fleet Management System 400 in signal-based communication with each other. Vehicle Charging Station 200 may generally comprise a plug-in interface for charging an electric or partially electric vehicle 110. System Power and Control Module 300 may generally comprise hardware and software for distributing power from a power source 120 to the Vehicle Charging System units 200. Fleet Management System 400 may generally comprise a software package that enables access, monitoring, and control of the charging system 100.

Vehicle Charging Station 200

Figure 2:
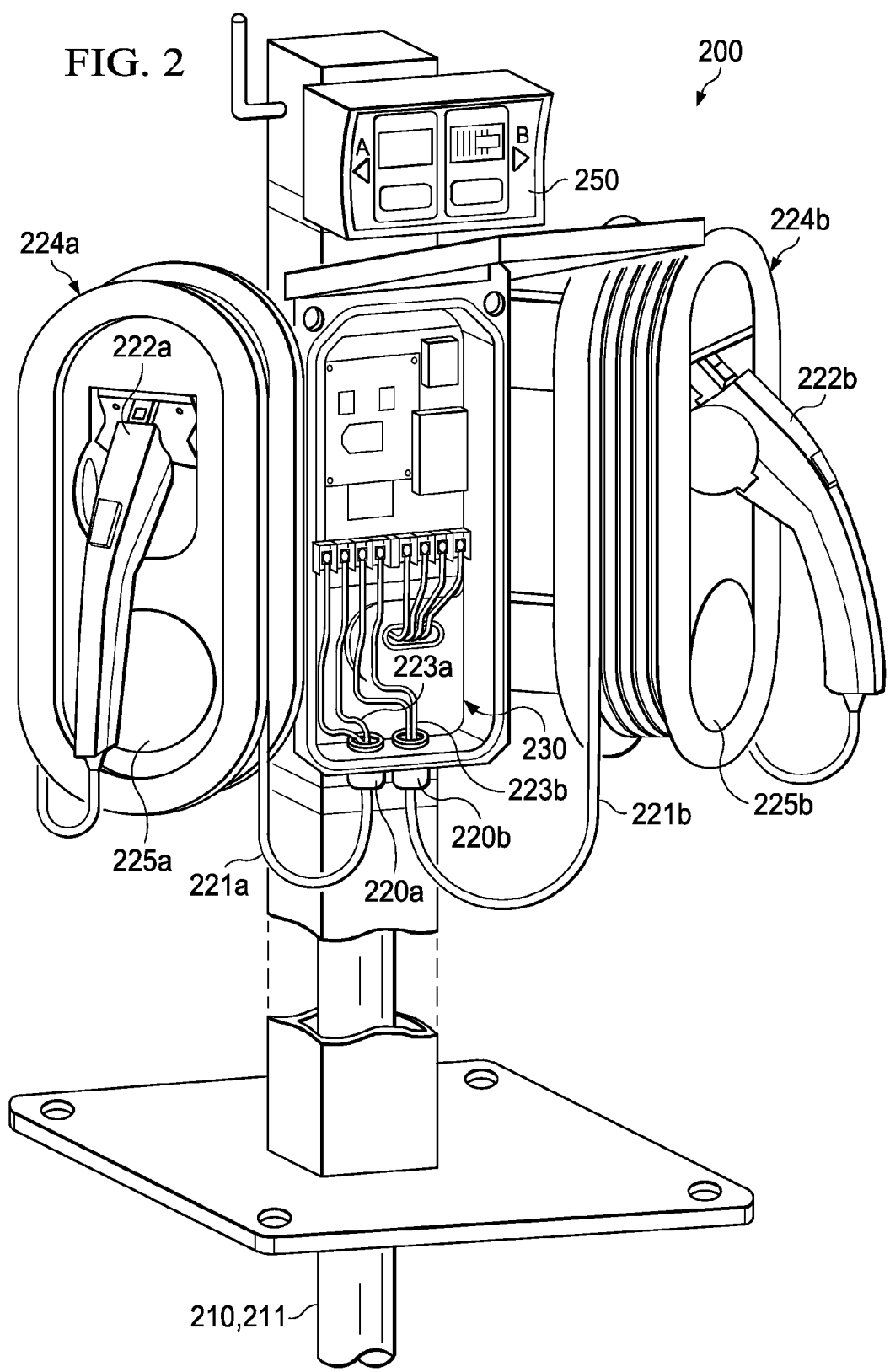
FIG. 2 depicts a perspective view of a vehicle charging station according to an embodiment of the present disclosure.
Figure 3:
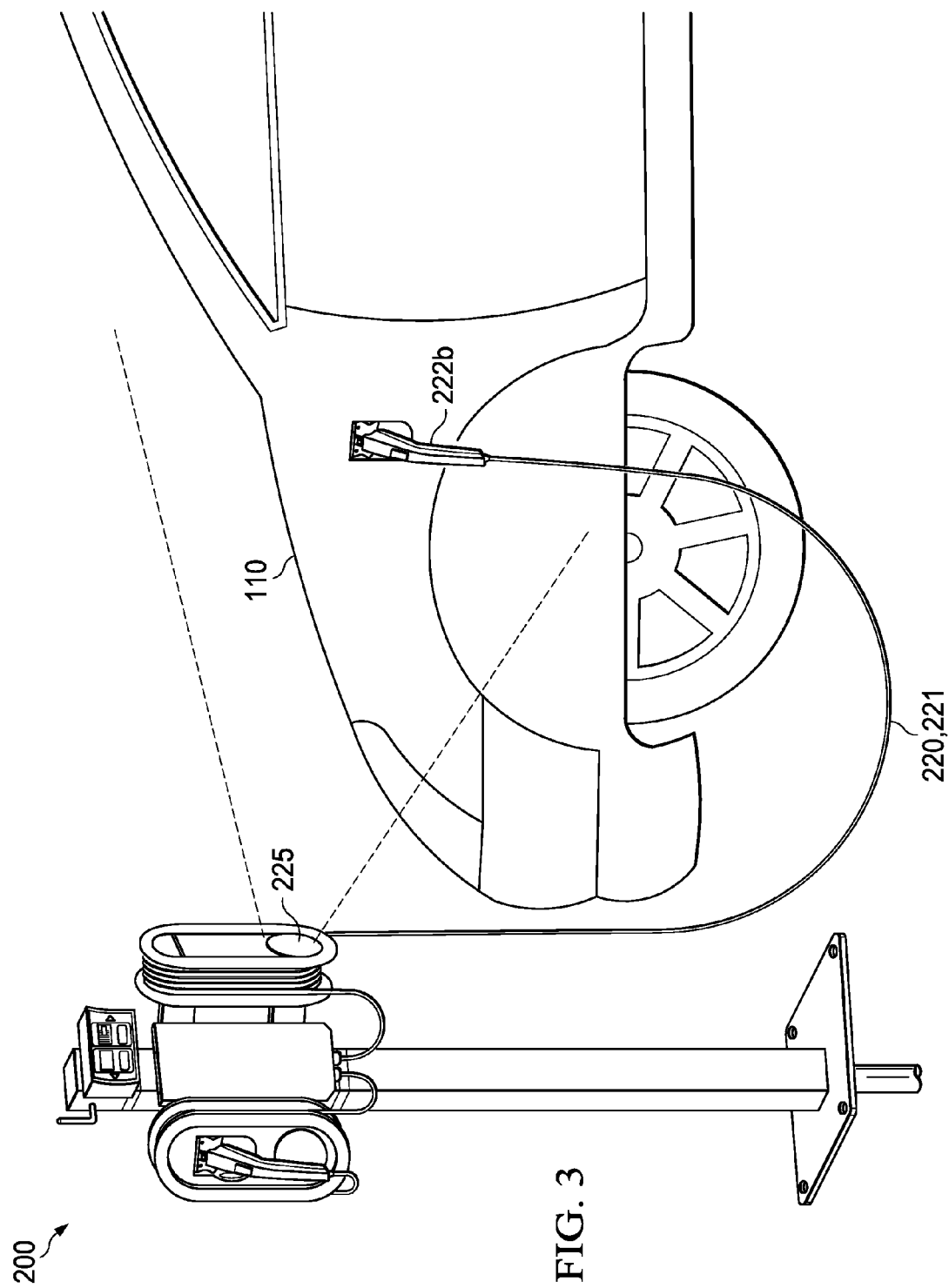
FIG. 3 depicts a perspective view of a vehicle charging station in operation to charge an electric vehicle according to an embodiment of the present disclosure.

Referring now to FIG. 2 and FIG. 3, electric vehicle charging station 100 may comprise one or more Vehicle Charging Station (VCS) 200. The VCS 200 may serve as an interface for a customer to connect to the charging system 100 and activate the charging cycle. VCS 200 may generally comprise a power input 210, a power output 220, a power/control/datacomm module ("PCD module") 230, and a user interface 250. Power input 210 may comprise any suitable mechanism for delivering electrical power to the VCS 200. In an embodiment, A/C power may be transmitted to the VCS 200 via a power conduit 211 from System Power and Control Module 300. One having ordinary skill in the art will recognize that there are numerous methods and hardware through which electrical power may be delivered to the VCS 200. Power output 220 may comprise any suitable mechanism for transmitting power from the VCS 200 to an electric vehicle 110. In an embodiment, one or more power cables 221 may carry power from the VCS 200 to an electric vehicle 110. Each power cable 221 may further comprise a connector 222 suitable for coupling power cable 221 to electric vehicle 110, such as a SAE J1772 compliant connector. VCS 200 may further comprise one or more cable managers 224. Cable manager 224 may comprise any mechanism suitable for holding, storing, positioning, and/or retracting/extending a cable 221 from VCS 200. VCS 200 may further comprise one or more lights 225 for illuminating the surrounding area, thereby assisting a user in operating the VCS 200 and/or providing security lighting. A cable 221 may extend to and couple with an electric vehicle 110 for charging.

Figure 4A:
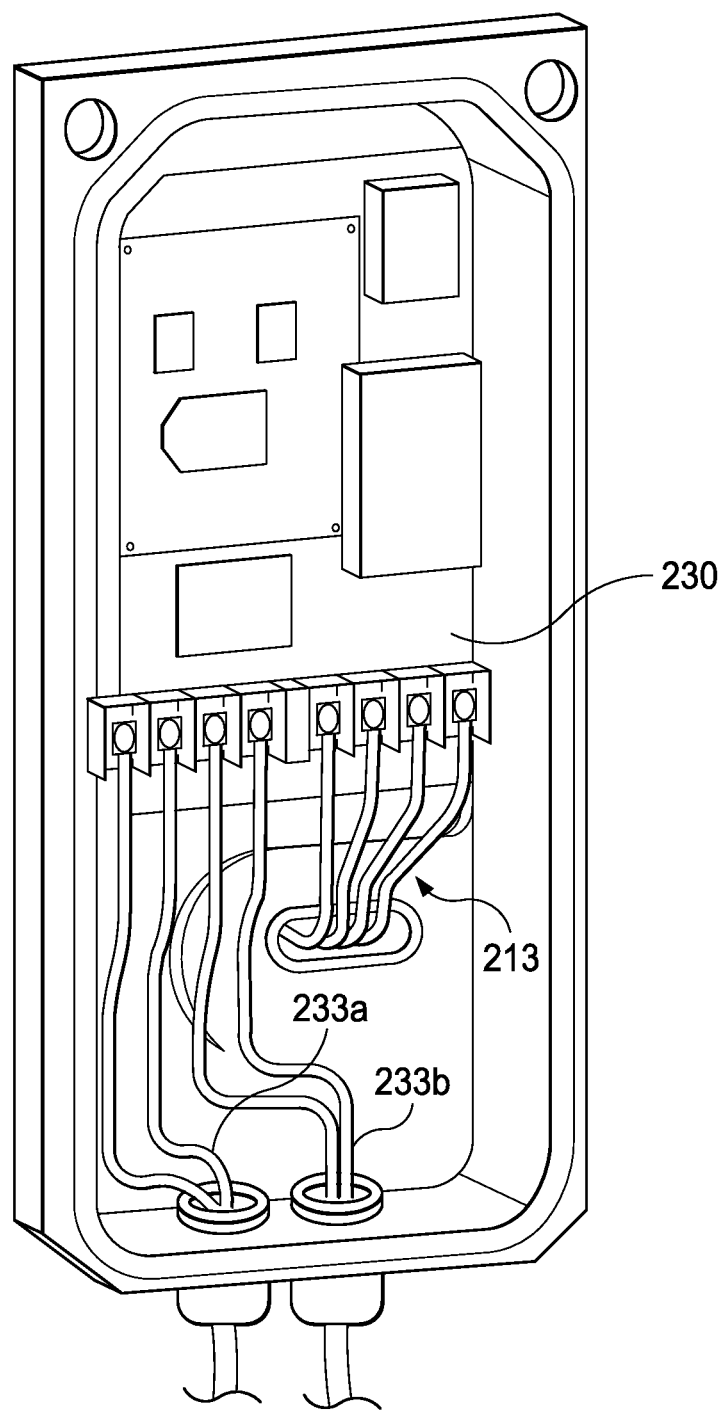
FIG. 4a depicts a partial frontal view of a power/control/datacomm module of a vehicle charging station according to an embodiment of the present disclosure.
Figure 4B:
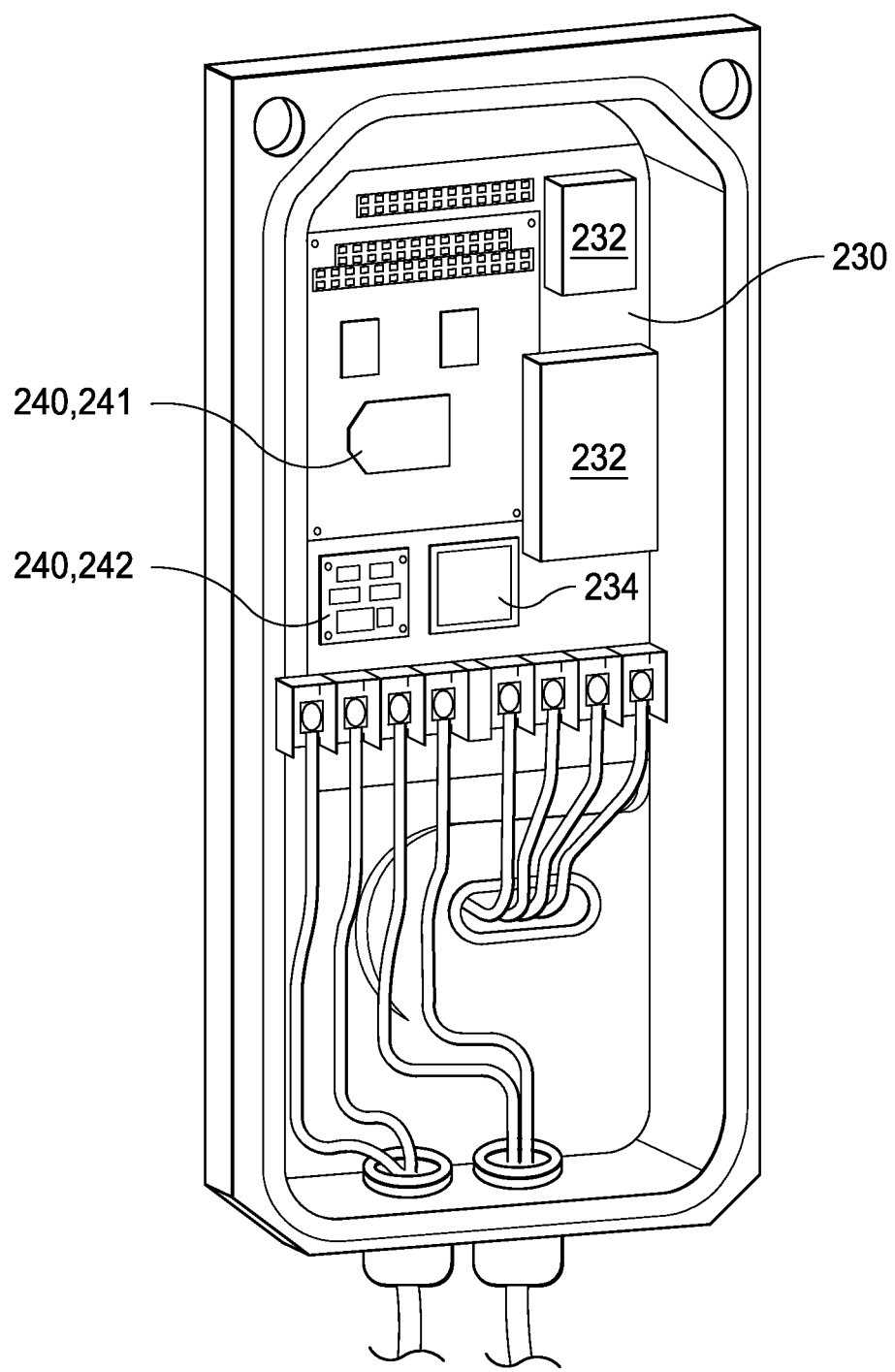
FIG. 4b depicts another partial frontal view of a power/control/datacomm module of a vehicle charging station according to an embodiment of the present disclosure.

Referring to FIGS. 4a and 4b, PCD module 230 of VCS 200 may comprise a suite of electronics and communications hardware and/or software capable of distributing and controlling power, monitoring alarms and status, communicating between an electric vehicle 110 and a System Power and Control Module 300, or other useful system function. In various embodiments, PCD module 230 may comprise a printed circuit board ("PCB") having one or more input power terminals 213, one or more power converters 232, one or more output terminals 233, one or more processors 234, and one or more communications devices 240. Power from power input 210 may be routed to the PCD through input terminals 213. Power converters 232 may comprise any suitable component capable of converting AC power to DC power (for example, converting 220 VAC to 12V or 5V DC) for utilization by low voltage board components. In an embodiment, two output terminals 233a and 233b direct charging power (such as 220 VAC) to two power cables 221a and 221b used to charge two electric vehicles 110a and 110b. Processor _ may comprise any suitable processing hardware, such as a Field Programmable Gate Array, and may be programmed with control logic suitable to perform the operations of the VCS 200. In an embodiment, communications devices 240 could possibly comprise a Zigbee™ wireless network device 241, an RFID wireless device 242, and/or a 3G/4G wireless modem. In another embodiment, communications devices 240 may further comprise one or more "add-on" circuit cards that may interface with PCD module 230 or another component of VCS 200. One having ordinary skill in the are should recognize that the present disclosure is not intended to be limited to the specific communications devices/protocols described herein, but rather may encompass any suitable device/protocol current known or later developed. In an embodiment, PCD module 230 may be integrated with VCS 200 as a modular plug-in device, allowing for it to be easily removed or repaired in the field.

RFID communications device 242 of PCD 230 may be capable of sensing and identifying an RFID tag (not shown). In an embodiment, a user may carry and be personally associated with a tag. In another embodiment, tag may be integrated into and/or associated with a certain electric vehicle 110, as shown schematically in FIG. 1. RFID communications device 242 may be in communication with a library of approved RFID access codes, and may be utilized for recognizing a user, verifying a user's identity, initiating a customized greeting, retrieving user information, and/or loading automatic setup information and preferences.

Figure 5A:
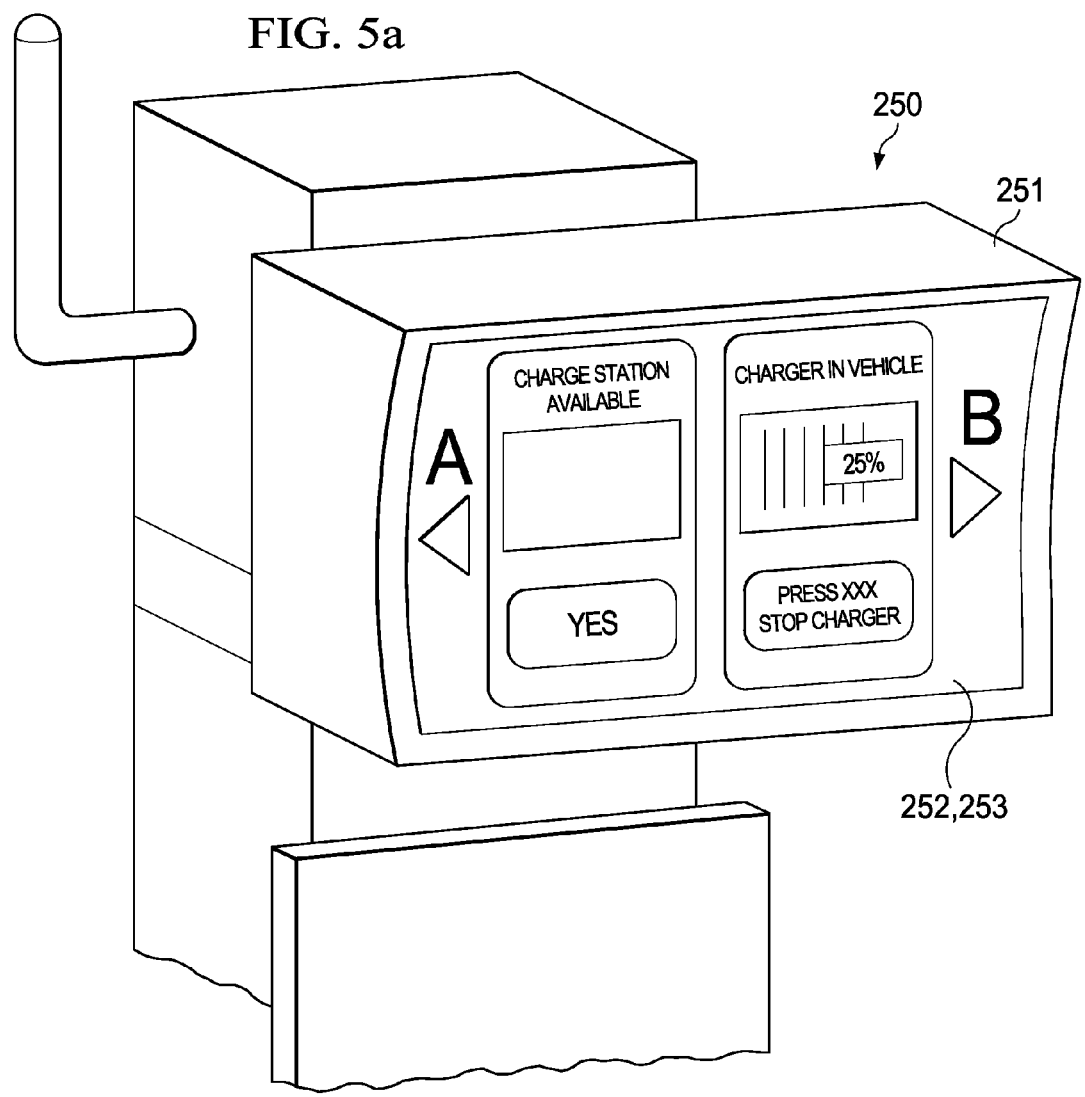
FIG. 5a depicts a frontal view of a graphical user interface of vehicle charging station according to an embodiment of the present disclosure.
Figure 5B:
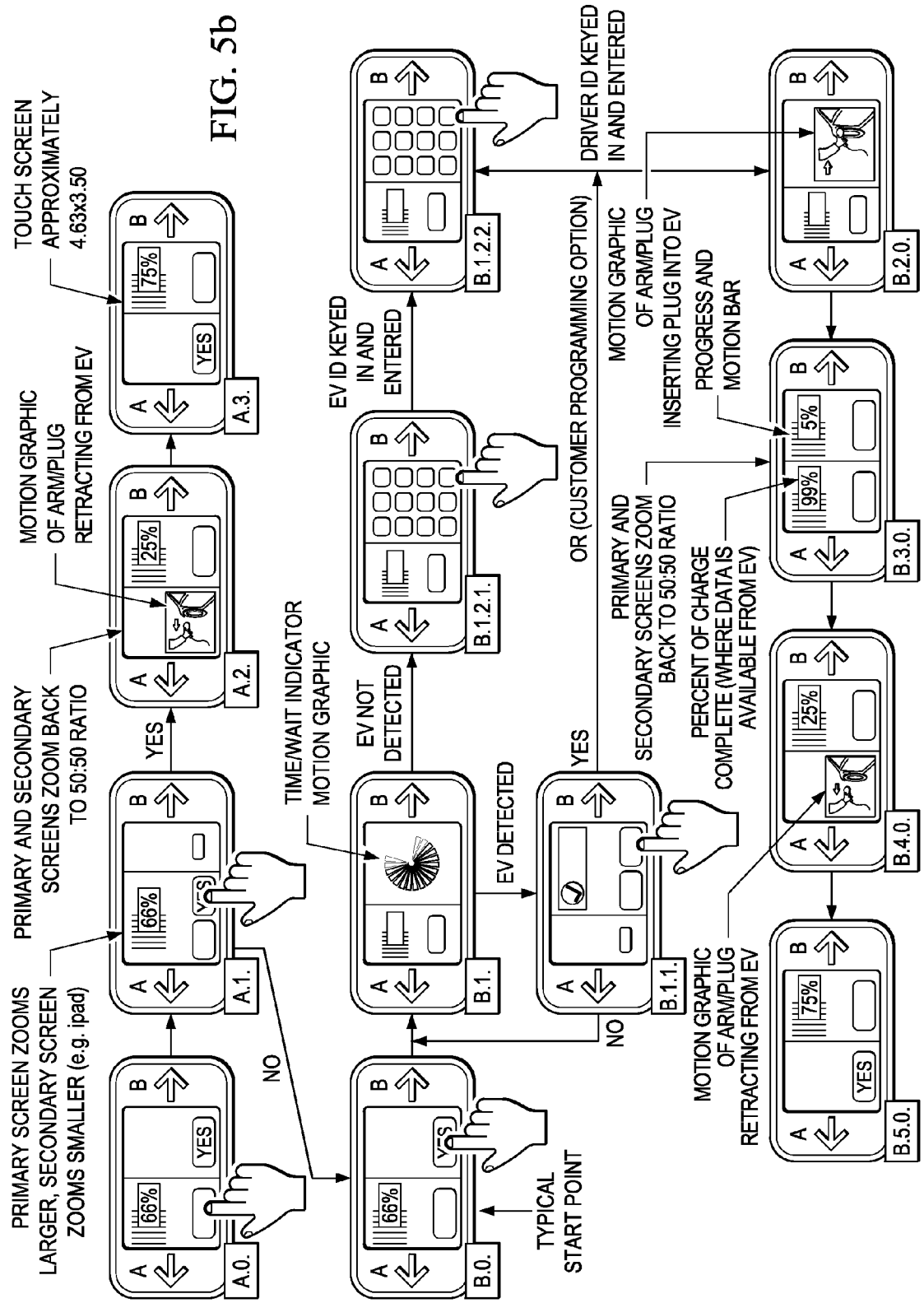
FIG. 5b depicts a schematic view of possible instructions provided by the graphical user interface of FIG. 5a according to an embodiment of the present disclosure.

Referring now to FIG. 5a, user interface 250 of VCS 200 may comprise any suitable hardware and/or software, such as one or more displays 251 and command input mechanisms 252, through which a user may control charging activity, and/or monitor charging status and other information. In an embodiment, user interface 250 of VCS 200 may comprise a touch screen 253 featuring a graphical user interface. Touch screen 253 may accept user touch commands that may, for example, initiate charger startup, charger shutdown, and charging inquiries. In various embodiments, touch screen 253 may be configured to display a user greeting, operational instructions, charging status, paid advertising, and other useful information such as weather alerts, news items, account status, etc. FIG. 5b depicts a possible sequence of instructions and logic for charging an electric vehicle 110 as shown on a touch screen interface 253 according to an embodiment of the present disclosure. In an embodiment, PCD module 230 may support the operation of user interface 250. One having ordinary skill in the art will recognize that a variety of information and commands may be displayed and effected, respectively, using operational logic known in the art. In yet another embodiment, separate user interfaces 250 may be provided for and associated with each power output terminal 223, respectively.

Figure 6A:
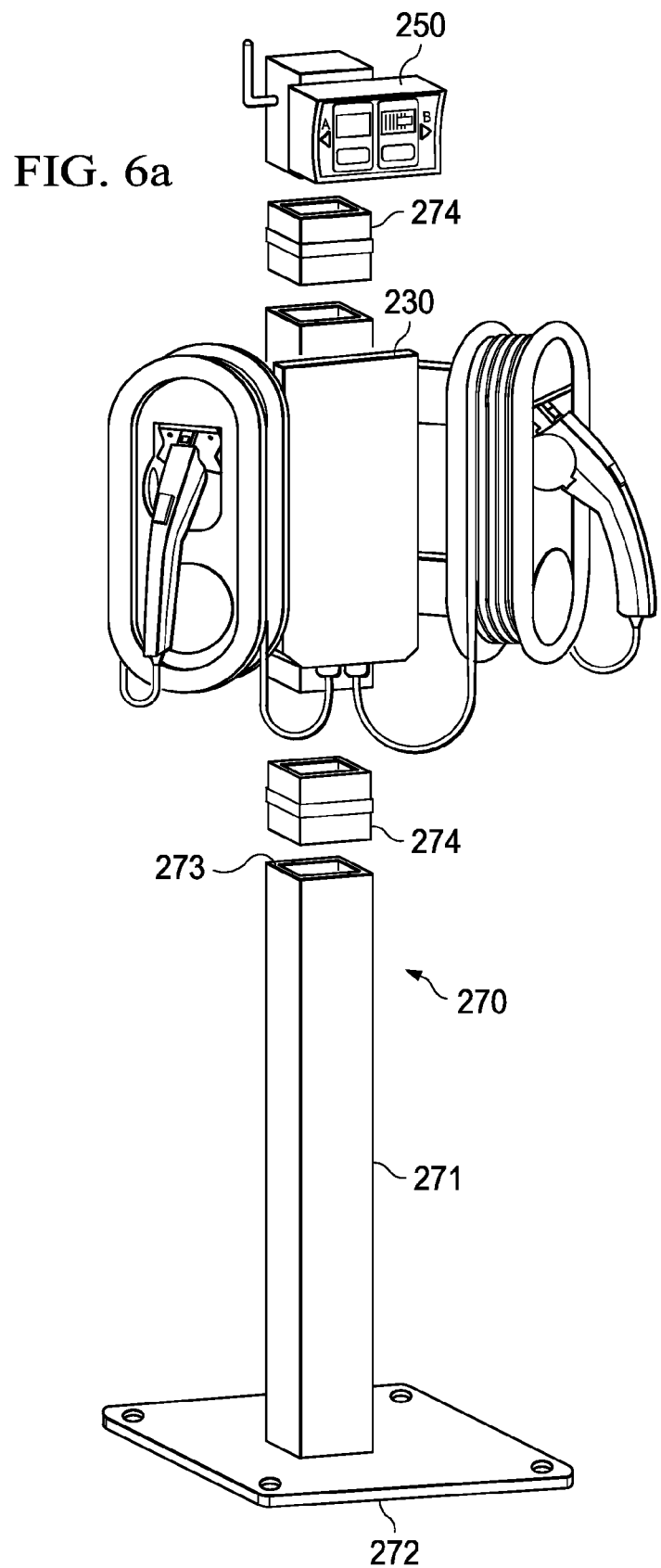
FIG. 6a depicts an exploded view of structure for supporting a vehicle charging station according to an embodiment of the present disclosure.
Figure 6B:
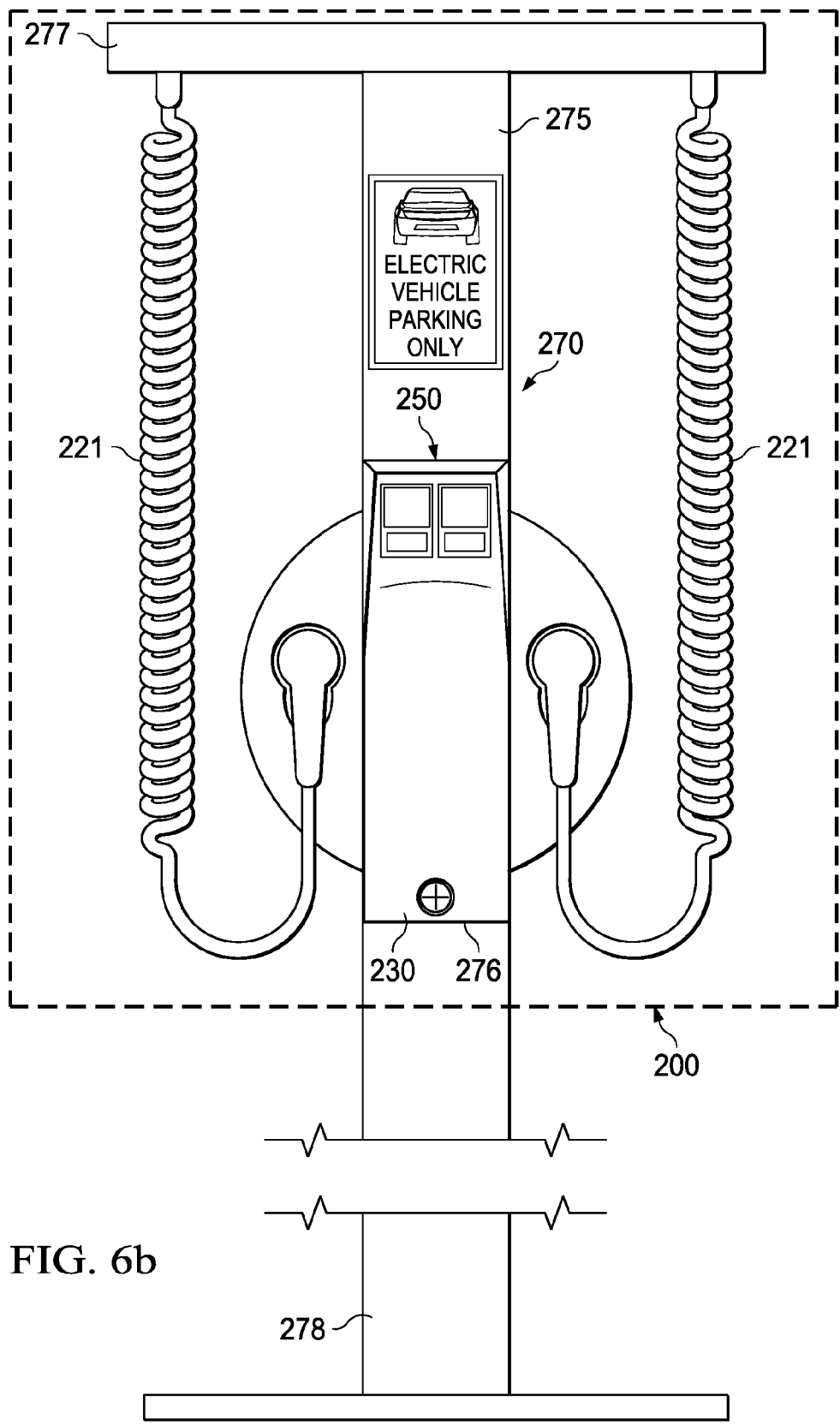
FIG. 6b depicts an alternative structure for supporting a vehicle charging station according to an embodiment of the present disclosure.

Referring to FIGS. 6a and 6b, VCS 200 may further comprise a support structure 270. Support structure 270 may comprise any suitable mechanism for positioning VCS 200 in a given location, such as a support pole, tower, or wall, and any related mounting hardware. Human factors considerations may drive the height, angle, and distance from nearby structure (such as curbs, walls, etc) at which VCS 200 is placed, and may also drive individual height placement of cable managers 224, connectors 222, and user interface 250. VCS 200 may be of a multi-piece, modular construction, allowing for it to be configured in alternative arrangements on a variety of support structures 270 to best suit the constraints and desired features of a given application, as well as to provide for enhanced manufacturability, repair, and replacement. Referring now to FIG. 6a, in an embodiment, a pole mount support structure 270 may comprise an elongated base 271 and one or more modular mechanical connectors 274. In operation, a first end 272 of pole base 271 may be coupled to the ground or other support surface, and a second end 273 may be coupled to VCS 200 using a modular connector 274 or other suitable mounting hardware. In various embodiments, components of VCS 200, such as PCD module 230 and user interface 250 may be coupled together using one or more modular connectors 274. Referring now to FIG. 6b, in another embodiment, support structure 270 may comprise a mounting pole 275, wherein PCD module 230 and user interface 250 may be coupled proximate to first end 276 (at an operable height), and coiled cables 221 may be coupled to and suspended from second end 277. Mounting pole 275 may be supported by a pole base 278 in pole-mounted embodiments, or may be coupled directly to nearby structure, such as a wall. In operation, a coiled cable 221 may be extended to an electric vehicle 110 for charging, and automatically retract to keep cables 221 off the ground and mitigate tripping hazards around VCS 200.

System Power and Control Module 300

Figure 8:
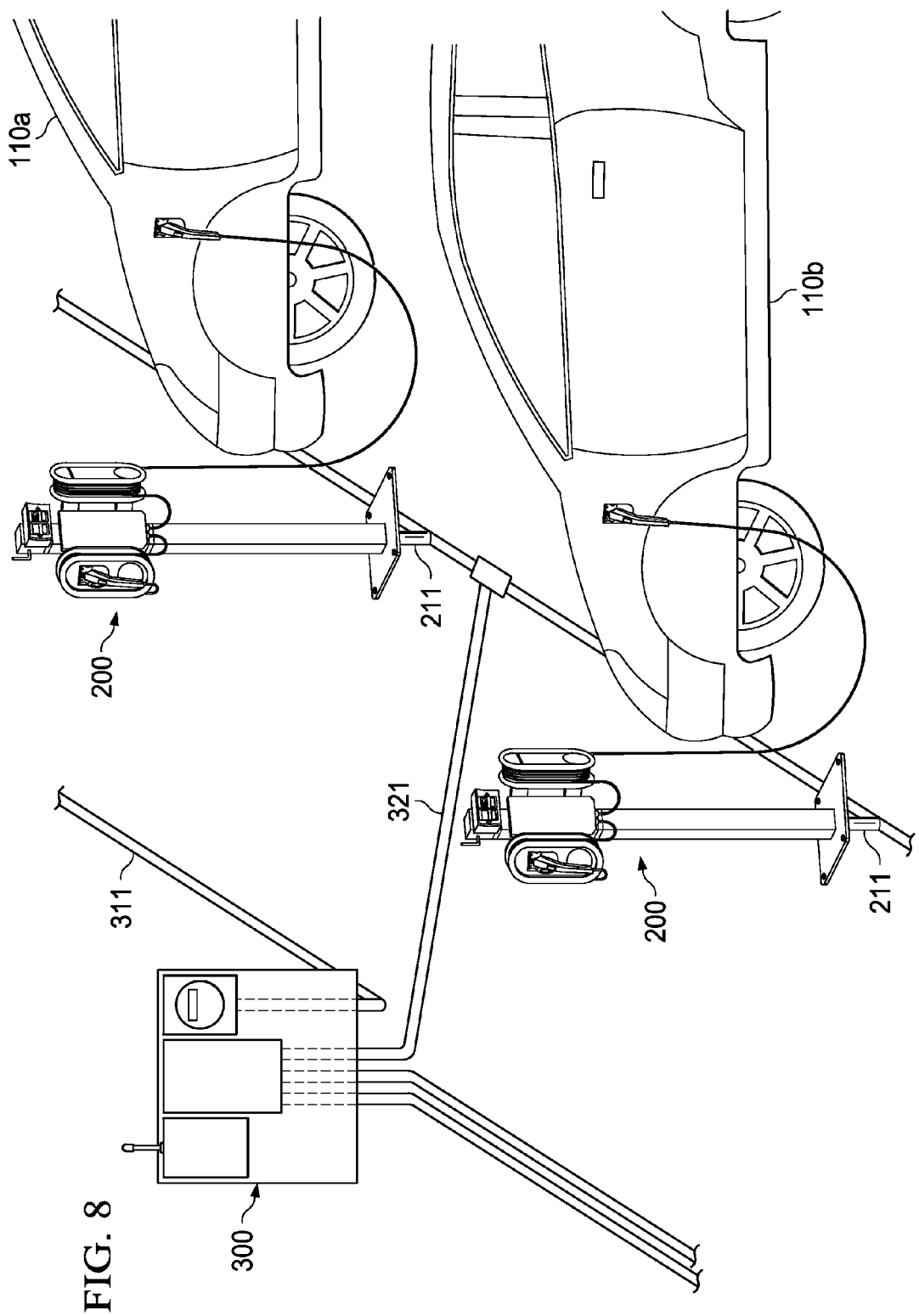
FIG. 8 depicts a perspective view of possible conduits for directing electrical power between some components of charging system according to an embodiment of the present disclosure.

Referring now to FIG. 7 and FIG. 8, electric vehicle charging system 100 may comprise a System Power and Control Module (SPCM) 300. The SPCM 300 may receive and distribute power from power source 120 to each VCS 200. SPCM 300 may also serve as a communications link and controller between each VCS 200, SPCM 300, and Fleet Management System 400. SPCM 300 may generally comprise a power input 310, a power output 320, a power meter 330, a power panel 340, and a communications module 350. Power input 310 may comprise any suitable mechanism for receiving electrical power from a power source 120, and may comprise in part a power conduit 311. Power input 310 may operate over a range of input voltages. In an embodiment, power input 310 may operate over a range of about 180 VAC to 260 VAC. One having ordinary skill in the art will recognize that there are numerous methods and hardware through which SPCM 300 may receive power from a power source 120. Power output 320 may comprise any suitable mechanism for transmitting power from the SPCM 300 to one or more VCSs 200, and may comprise one or more conduits 321. FIG. 8 depicts an embodiment in which A/C power may be transmitted to each VCS 200 via one or more power conduits 321 from System Power and Control Module 300. In various embodiments, power conduit 321 may run overhead or underground.

Referring back to FIG. 7, power meter 330 may comprise any suitable mechanism for measuring the amount of power drawn by SPCM 300 from power input 120. In an embodiment, power meter 330 may comprise a CENTRON® Polyphase power meter. In another embodiment, power meter 330 may comprise a smart meter 331, such as an OpenWay® CENTRON® smart meter, to optimize charge times based on time of day utility rates. Smart power meter 331 may measure "time of day" power usage and may relay that data to communications module 353 (later described) via a communications link, where it can be fed to various other components of system 100. Smart power meter 331 may be synchronized with industry standard Advance Metering Initiative (AMI) protocols or other protocols.

Figure 9:
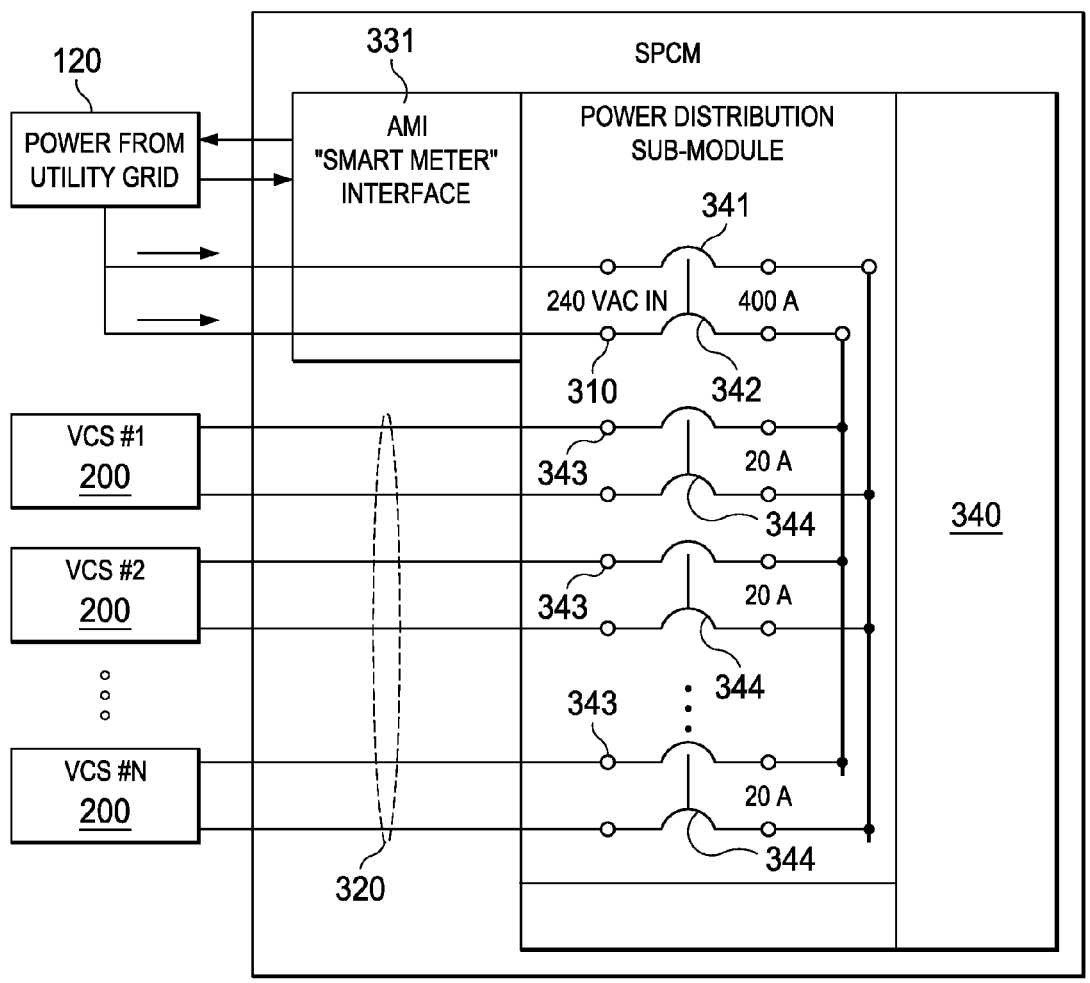
FIG. 9 depicts a schematic view of possible power distribution amongst some components of charging system according to an embodiment of the present disclosure.

Referring now to FIG. 9, power panel 340 may serve to distribute power from power input 310 to power outputs 320. Power panel 340 may generally comprise a main circuit 341, one or more main circuit breakers 342, one or more branch circuits 343, and a corresponding number of branch circuit breakers 344. Main circuit 341 may comprise any suitable electrical circuit for delivering power from power input 310 to branch circuits 343. Branch circuits 343 may comprise any suitable electrical circuits for transmitting power from main circuit 341 to power outputs 320. Breakers 342, 344 may comprise any suitable circuit protection mechanisms for safely governing power through the aforementioned circuits. In various embodiments, power panel 340 may comprise circuits 341, 343 that are capable of sensing electrical load associated with battery charge levels during re-charging operations, and may adjust input voltage accordingly to safely achieve faster charge rates. In one such embodiment, a voltage metering circuit may sense battery voltage and report charge status based on this reading. An embedded software-driven lookup table may relate the determined charge level with an appropriate charge current, and the current may be adjusted accordingly. In another such embodiment, an EV-M device 113 (later described) may collect and store data from a vehicle's OBD-II port, including but not limited to, vehicle odometer reading, vehicle speed, battery charge level, and driver handling data, and wirelessly communicate battery charge level to the FMS 400. An embedded software-driven lookup table may relate the determined charge level with an appropriate charge current and the current may be adjusted accordingly. Charge sensing circuits 341, 343 may monitor functionality of hardware and software in system 100 for possible failures or alarms, and may invoke a current limit function in the event thereof. In an embodiment, the current limit function may cause a "fallback" to a guaranteed safe operational level. In another embodiment, the current limit function may cause the system 100 to shut down to prevent equipment damage or unsafe charging conditions. One having ordinary skill in the art will recognize that power panel 340 may comprise a variety of circuits 341, 343 and breakers 342, 344 and arrangements thereof for a given application.

Figure 10:
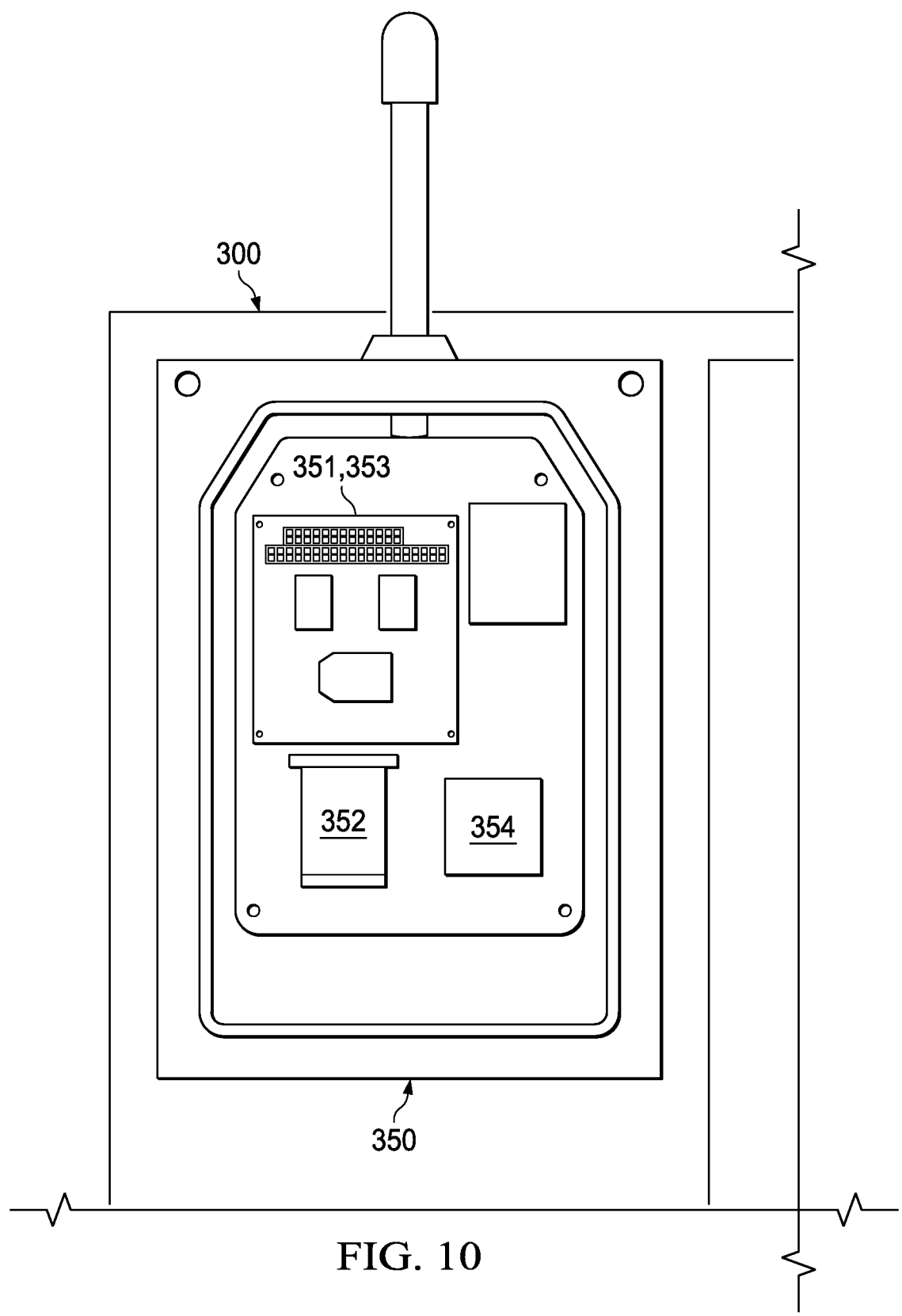
FIG. 10 depicts a perspective view of a communications module of system power and control module according to an embodiment of the present disclosure.

Referring now to FIG. 10, communications module 350 may serve as an interface for communications between each VCS 200, SPCM 300, and Fleet Management System 400. Communications module 350 may comprise one or more devices 351 capable of sending and/or receiving communication signals between SPCM 300 and VCS 200. Communications module 350 may further comprise one or more devices 352 capable of sending and/or receiving communication signals between SPCM 300 and Fleet Management System 400. In an embodiment, device 351 may comprise a relatively short-range wireless communication device, such as a Zigbee™ modem, and device 352 may comprise a relatively long-range wireless communication device, such as a cellular 3G/4G modem. Communications module 350 may further comprise a device 353 capable of sending and/or receiving communication signals between SPCM 300 and a locally-mounted smart meter 331. A processor 354 may perform various logic routines like optimizing charging schedules as a function of utility rate (in an embodiment, from smart meter 331) and adjusting charging parameters to meet charging deadlines and economy goals. In another embodiment, an "add-on" circuit card may be used to add optional communications features.

Fleet Management System 400

Figure 11:
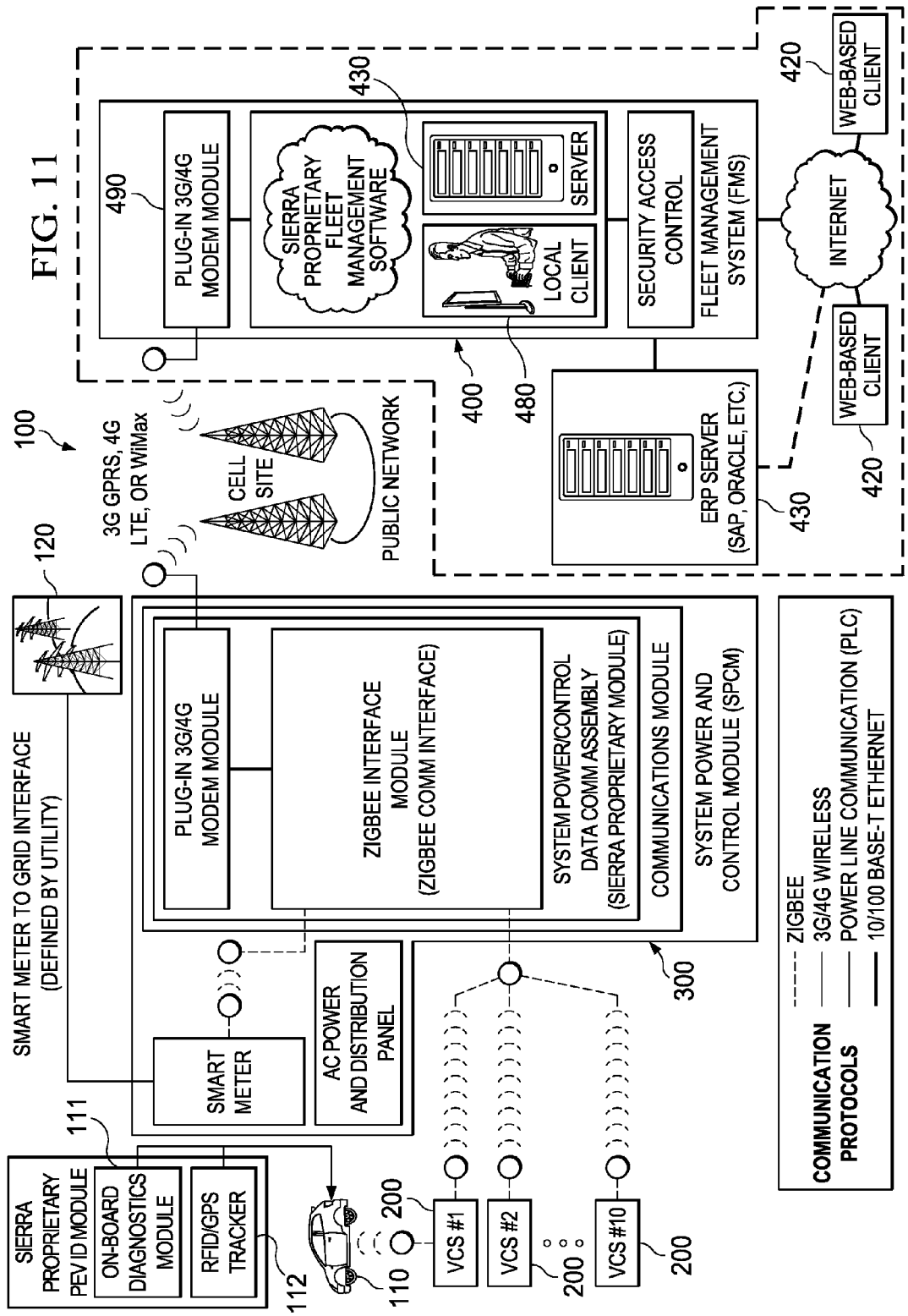
FIG. 11 depicts a schematic view focusing on a fleet management system according to an embodiment of the present disclosure.

Referring now to FIG. 11, electric vehicle charging system 100 may comprise a Fleet Management System (FMS) 400. The FMS 400 may generally comprise a software package for accessing, monitoring, and/or controlling the electric vehicle charging system 100. FMS 400 may communicate with various components of system 100 including, but not limited to, power source 120, SPCM 300, VCS 200, and electric vehicle 110. In various embodiments, FMS 400 may receive system data, send system operating instructions, and may store, sort, and report useful system operation and performance data. FMS 400 may be loaded on and accessed from a client interface 420 such as a computer terminal. A data repository 430, such as a local server or a cloud-based server, may store information reported by FMS 400, and may contain a library of approved RFID access codes and identifications of individual electric vehicles 110. A communications module 490 may be used to establish a communications link as later described. One having ordinary skill in the art will recognize that the previously described FMS 400 software and hardware implementation is merely illustrative, and is intended to incorporate any suitable alternative embodiments.

Referring to FIG. 12, FMS 400 may feature a user interface 410. User interface 410 may assist in tasks such as accessing electric vehicle information 440 and comprehensive system information 450, tracking and reporting system alarms 460, creating standard and customizable reports 470 of user-selected data, and accessing departmental usage and billing information 480. In an embodiment, user interface 410 may provide system access security through user ID/password or other known security protocols known in the art. In various embodiments, user interface 410 may comprise a web-based graphical user interface (GUI) for navigating and implementing its various features and capabilities.

Referring now to FIGS. 13a and 13b, user interface 410 may be used to access useful information 440 regarding each electric vehicle 110 such as its identification number 441, type 442 (i.e., make/model or size classification), availability status 443, odometer mileage 444, number of charge cycles 445, and next scheduled maintenance 446. One having ordinary skill in the art will recognize that information 440 of the present disclosure should not be limited to the above referenced availability and statistical data, and that the previous examples are provided for illustrative purposes only.

Referring now to FIGS. 14a and 14b, user interface 410 may be used to access further information 440 regarding each electric vehicle 110 such as its physical location 447 and on-board diagnostics data 449. In an embodiment, FMS 400 may enable a user to select an available, charged electric vehicle 110 for checkout, and display the location 447 of the vehicle 110 on a map 448, as depicted in FIG. 14a. In an embodiment, EV Network Module ("EV-M") 113 may plug into an on board diagnostics system of an electric vehicle via its OBD-II port 111. EV-M 113 may collect and store diagnostics data 449 including, but not limited to, vehicle odometer reading, vehicle speed, battery charge level, and driver handling data, in addition to other relevant metrics such as those identified in FIG. 14b. In various embodiments, EV-M 113 may transmit data 449 to FMS 400 via a local wireless network, or an in-vehicle smart device (such as a smart phone) via communications network 500 (later described). EV-M 113 may sample diagnostics data 449 periodically. In an embodiment, sampling may occur with high frequency, such as once every half second. Frequent sampling may enable frequent and more useful calculations of performance metrics. Information 440 may be displayed in any useful format and is not limited to the format depicted by the above referenced figures. Color coding or other suitable identification method may be used to visually or audibly draw attention to certain noteworthy information 440, such as that regarding availability status and whether diagnostic parameters are within specification limits. In another embodiment, hyperlinks may be included to access some relevant information 440 displayed on other screens.

Figure 15:
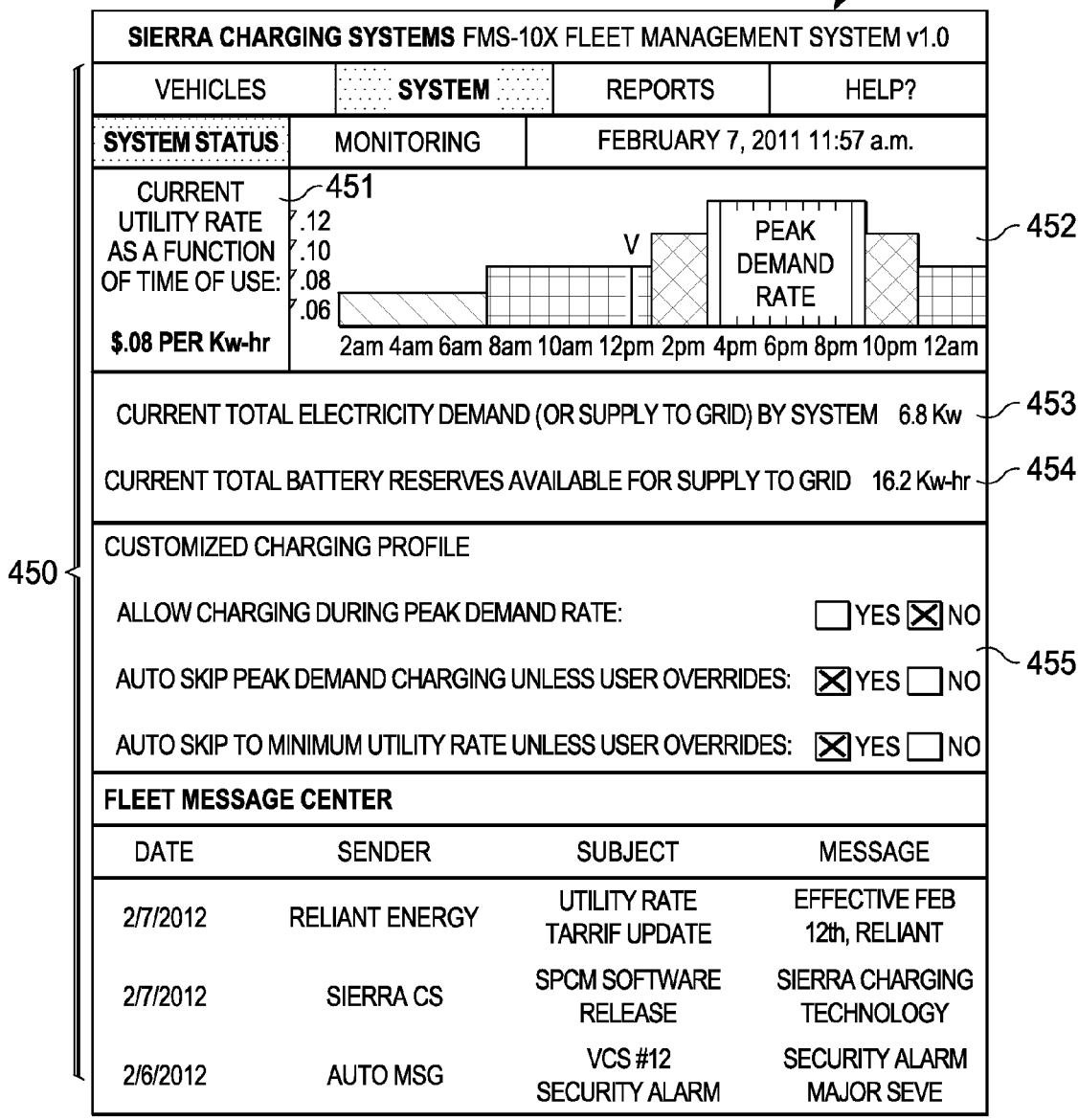
FIG. 15 depicts an illustrative view of a possible fleet management user interface display directed to vehicle charging status and utility rate information according to an embodiment of the present disclosure.

Referring now to FIG. 15, user interface 410 may be used to access useful system information 450 such as charging status and utility rate information. For example, user interface 410 may display the current utility rate as a function of time use 451, time-of-day utility rates 452, the current total electricity demand (or supply) 453 by system 100, and the current total stored reserves available for supply 454 by system 100. User interface 410 may also be used to support and manage a variety of fleet settings and preferences 455 for FMS 400, such as the preferred time of day for charging, and V2G (Vehicle-to-Grid) operating characteristics (later described).

Referring now to FIG. 16, user interface 410 may be used to monitor and report system alarms 460 in FMS 400. For example, alarms 460 may be displayed and described by metrics such as time/date, severity, location, description/code (security violation, communications failure, etc.), and status (open, resolved, etc.). In an embodiment, comprehensive information such as the total number of active alarms, major alarms, minor alarms, and alarm frequency may also be monitored and reported.

Referring now to FIG. 17, user interface 410 may be used to generate standard and/or custom reports 470 of user-selected data available through FMS 400. Reports 470 may report metrics such as system energy consumption, peak demand hours charged, energy consumed per vehicle, energy consumed per driver, total energy cost, and total energy supplied by system 100. In an embodiment, reports 470 and accompanying preferred settings/configurations may be saved and accessed by user interface 410 for simple report generation. Reports 470 may be organized and displayed in any useful format, such as in a table, chart, list, etc.). In an embodiment, FMS 400 may store, sort, and report performance data for an electric vehicle 110, possibly by combining charging data with on-board diagnostics data from electric vehicle 110.

Referring now to FIG. 18, user interface 410 may be used to access departmental usage and billing information 480 such as account balances for various fleet departments. In an embodiment, FMS 400 may allow departmental account balance tracking and reporting via an interface to a fleet owner's ERP system such as SAP or Oracle.

FMS 400 User Interface Application

Figure 19A:
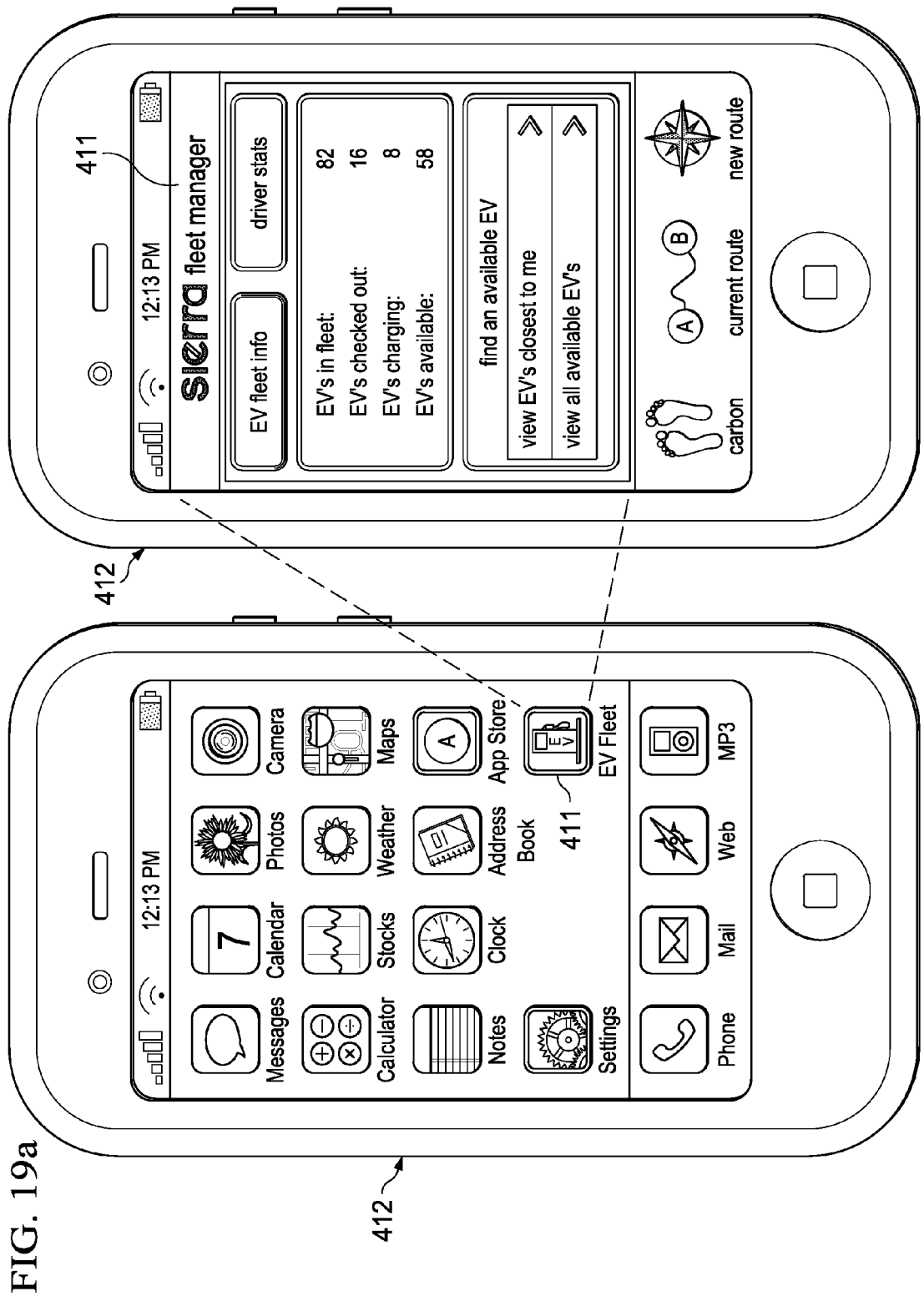
FIG. 19a depicts an illustrative view of a fleet management application-driven interface in operation on a smart device according to an embodiment of the present disclosure.
Figure 19B:
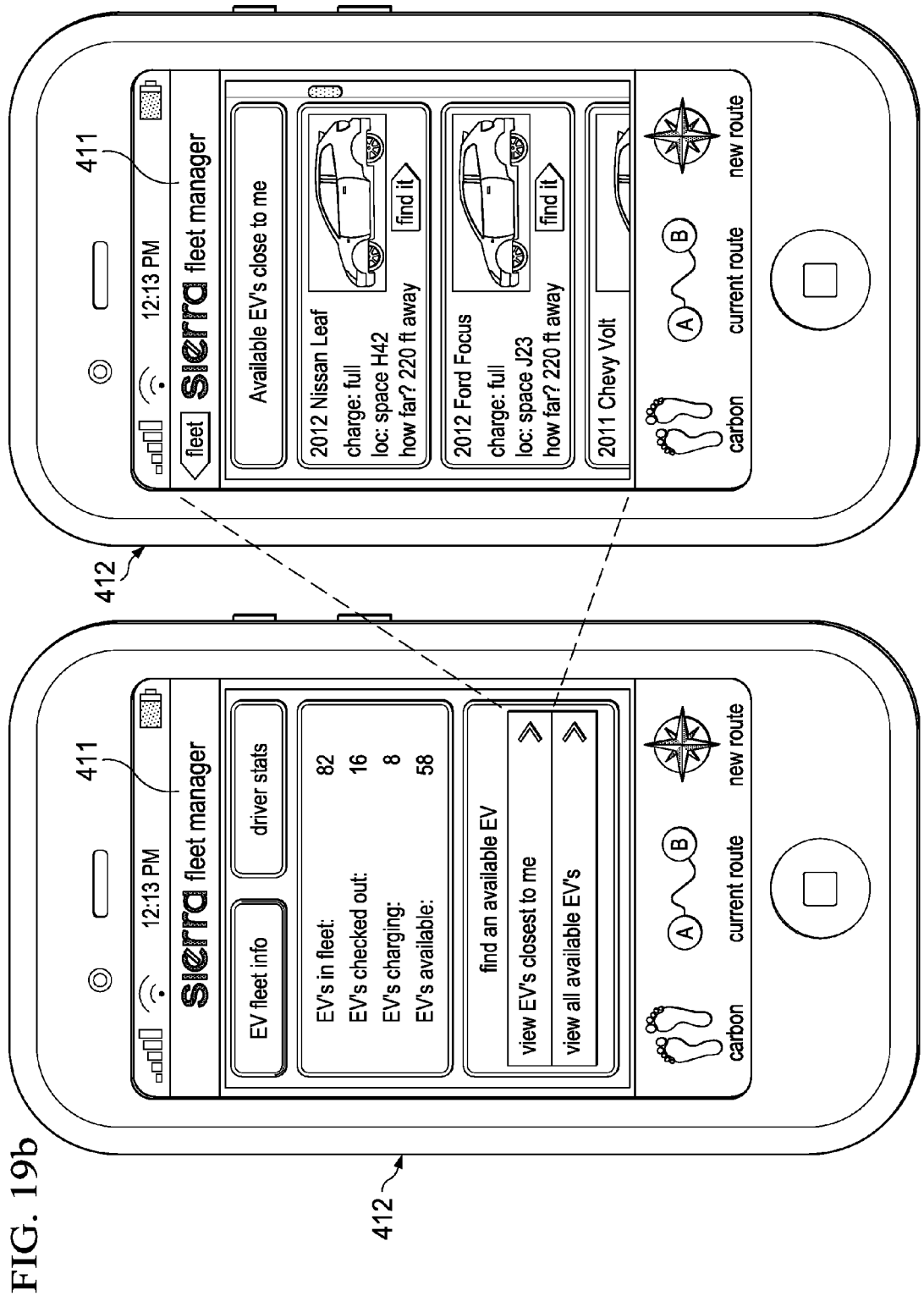
FIG. 19b depicts an illustrative view of a fleet management application-driven interface in operation on a smart device to view proximate electric vehicles according to an embodiment of the present disclosure.
Figure 19C:
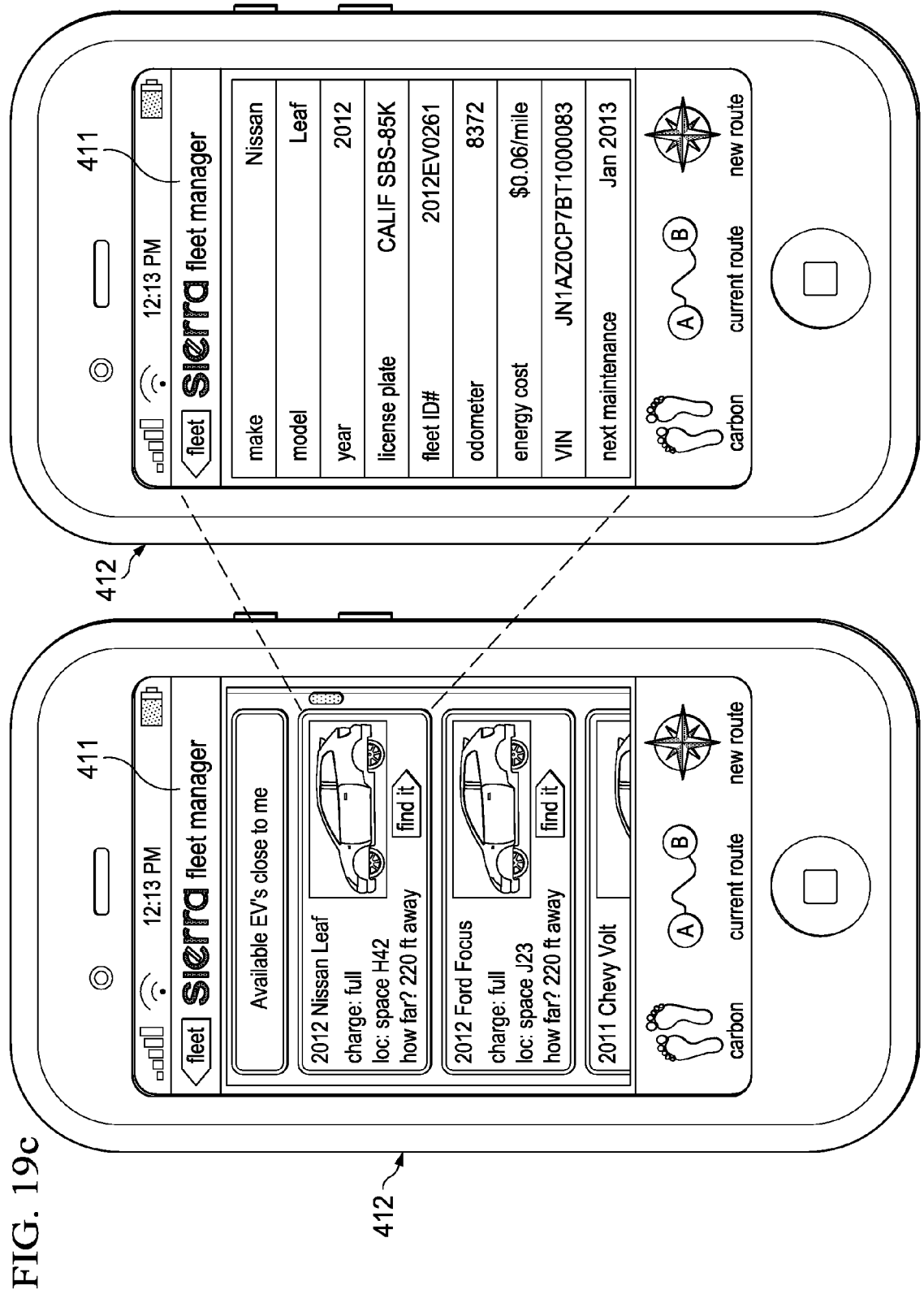
FIG. 19c depicts an illustrative view of a fleet management application-driven interface in operation on a smart device to view information specific to a selected vehicle according to an embodiment of the present disclosure.
Figure 19D:
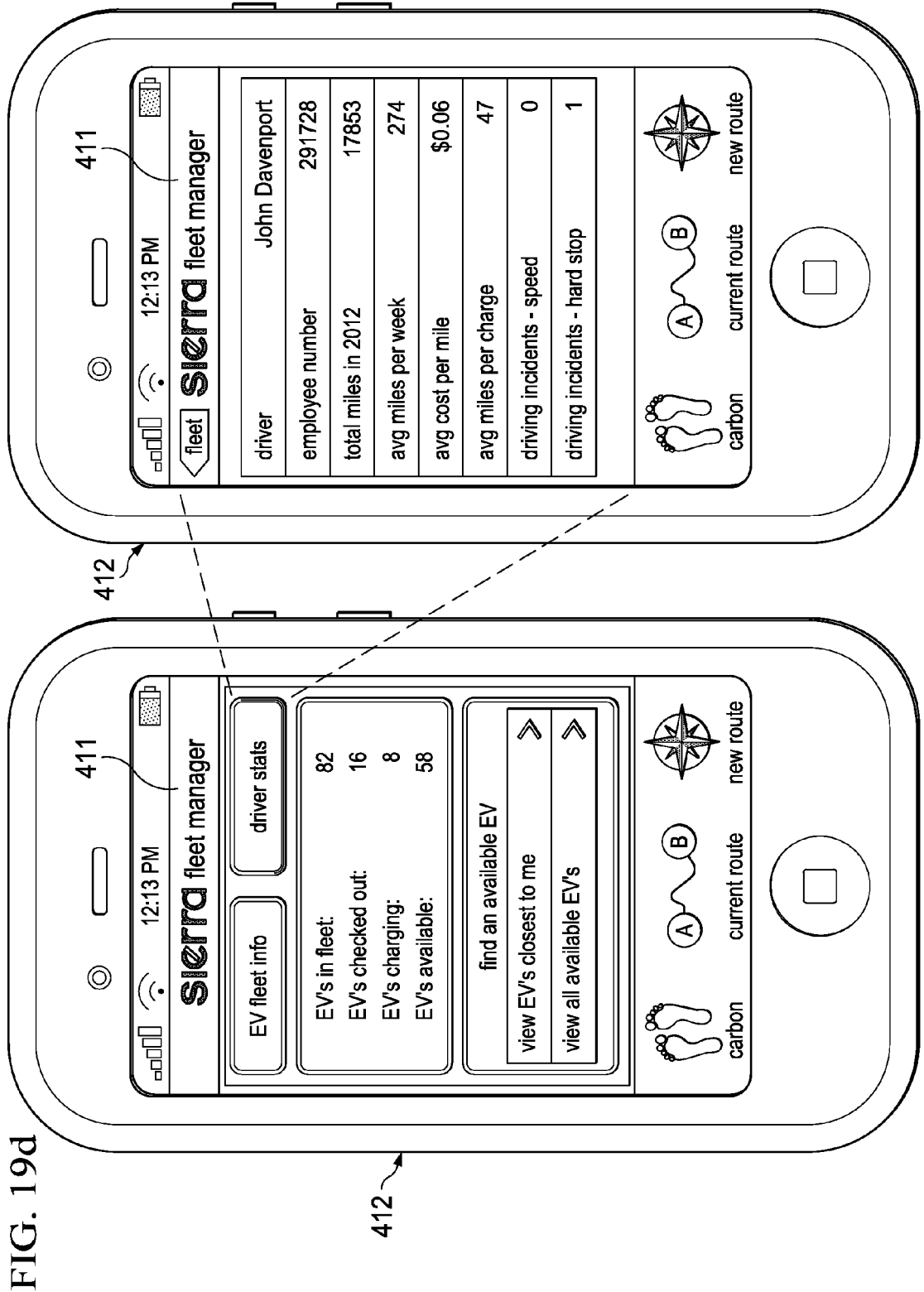
FIG. 19d depicts an illustrative view of a fleet management application-driven interface in operation on a smart device to view information specific to a selected driver according to an embodiment of the present disclosure.

Referring now to FIGS. 19a-d, user interface 410 may further comprise an application-driven extension ("app") 411 for use on a smart device 412, such as a tablet or smart phone, web application, or any other suitable medium. Referring to FIG. 19a, app 411 may comprise a main page that summarizes available electric vehicles 110 and their charge status, and sub pages with more detailed groupings of relevant information. In an embodiment, a sub page may feature a scrollable list of electric vehicles 110, their locations, and charge status as shown in FIG. 19b. In another embodiment, a sub page may feature performance, mileage, usage data, energy cost per mile driven, and maintenance data for a selected electric vehicle as shown in FIG. 19c. In yet another embodiment, a sub page may display administrative and driver history data for a specific fleet driver as shown in FIG. 19d.

App 411 may further comprise one or more embedded algorithms for extracting, sorting, and manipulating fleet data. In various embodiments, data regarding one or more electric vehicles 110, including but not limited to, vehicle odometer reading, vehicle speed, battery charge level, driver handling data, alarm status, and maintenance alerts, may be retrieved from an on-board diagnostics module via EV-M 113 for one or more of the various uses described herein. Alternatively or additionally, one or more algorithms may access extract, sort, and manipulate data to determine utility electricity used and electricity cost for charging a specific electric vehicle 110 in the fleet, utility electricity rate, and driver-specific performance data such as cost per mile, hard braking, overspeed, etc.

App 411 may further comprise embedded algorithms for calculating useful data. In various embodiments, embedded algorithms may calculate the following: energy cost per mile driven for each electric vehicle 110, carbon emission reductions for specific electric vehicles 110, drivers, and full fleet, distance and directions to specific electric vehicles 110, average miles driven per week for a specific driver, and percent of charging energy used by fleet at peak time energy cost. This algorithm may use data from the vehicle as transmitted by the EV-M 113 to the smart device 412 or FMS 400.

In an embodiment, system 100 may comprise a networked fleet of rental electric vehicles 110. FMS 400 may support logistics and operations of such an embodiment. App 411 may provide a user interface 410 therewith. In an embodiment, app 411 may enable registration of the user into rental program software in FMS 400. App 411 may enable the user to check the charge status of available fleet electric vehicles 110, reserve an electric vehicle 110, and unlock the reserved electric vehicle 100 when ready for use. App 411 may further share applicable user agreements (for app software and vehicle usage) with a user, and may track and report metrics such as usage cost and elapsed rental time to a user. In an embodiment, such metrics may be reported in real time. Through the concept of collaborative consumption, registered users of the system would be able to treat the pool of electric vehicles in the fleet as a shared transportation resource.

One having ordinary skill in the art will recognize that the features of FMS 400 and user interface 410 are for illustrative purposes, and are not intended to be exhaustive.

Communications Network 500

Figure 20:
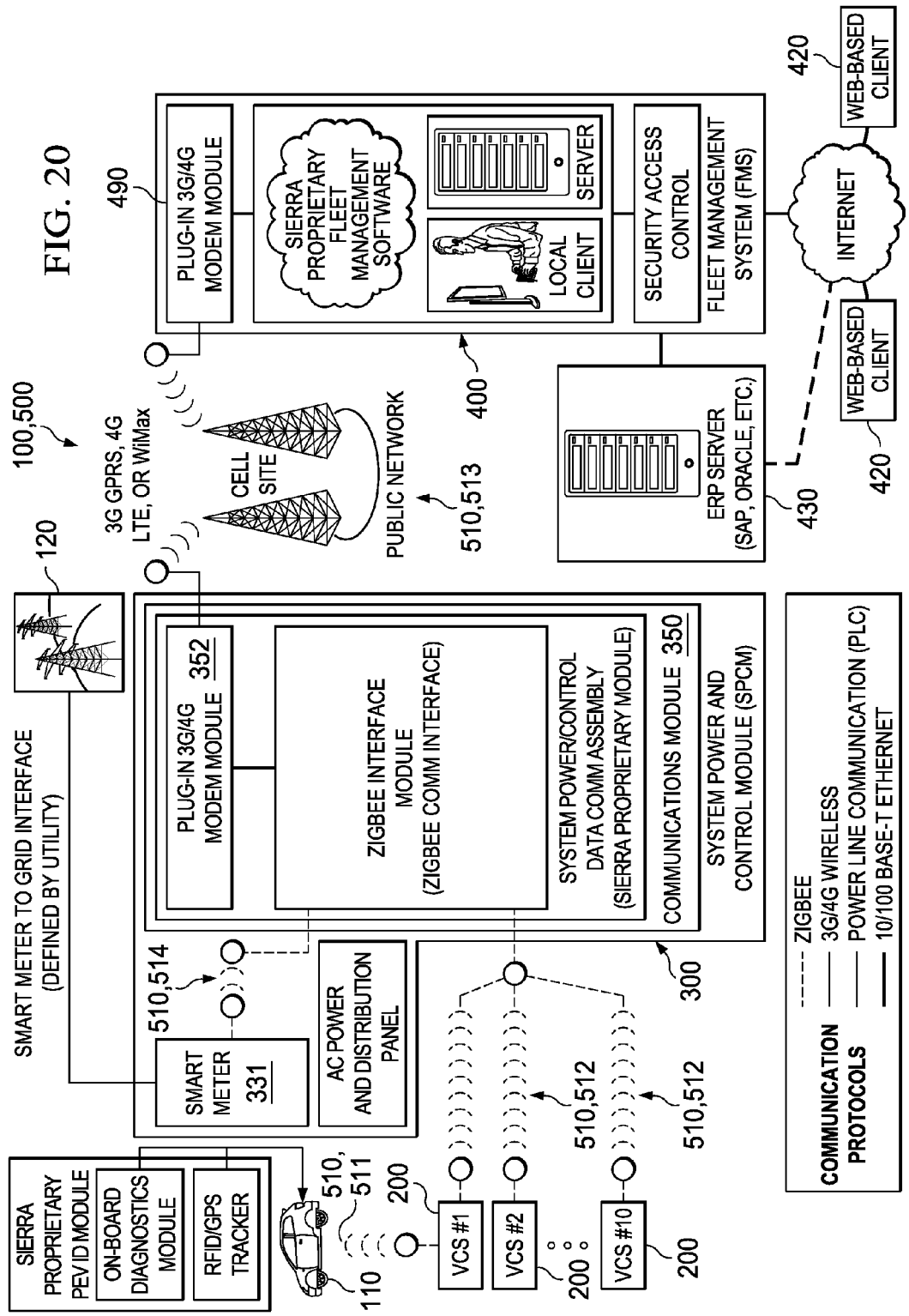
FIG. 20 depicts a schematic view of a communications network of electric vehicle charging system according to an embodiment of the present disclosure.

Referring now to FIG. 20, components of electric vehicle charging system 100 may be connected by a communications network 500. Communications network 500 may comprise various individual connections 510. Connections 510 may connect some components of system 100, such as VCS 200, SPCM 300, and FMS 400, to each other. Connections 510 may further connect system 100 to electric vehicles 110 and power source 120. In an embodiment, some or all of the information transferred over a connection 510 may be transferred over one or more connections 510. In another embodiment, information may be transferred in one or both directions across a given connection 510. In yet another embodiment, communications network 500 may connect to the Internet and be accessed via a secure login ID and password.

Communications network 500 may comprise one or more communications link 511 between electric vehicle 110 and VCS 200. Each connection 511 may comprise any suitable communications link known in the art. In an embodiment, connection 511 may comprise a wireless communications link, such as Zigbee™, between electric vehicle 110 and PCD module 230 of VCS 200. Connection 511 may be used to transfer information and commands between electric vehicle 110 and VCS 200 including, but not limited to, charge control, metering, alarm information, and on-board diagnostics information. In another embodiment, connection 511 may comprise an RFID data communication connection 511 for transmitting/receiving identification information between electric vehicle 110 and VCS 200.

Communications network 500 may further comprise one or more communications link 512 between VCS 200 and SPCM 300. Connection 512 may comprise any suitable communications link known in the art. In an embodiment, connection 512 may comprise a wireless communications link, such as Zigbee™, between communications module 240 of VCS 200 and communications device 350 of SPCM 300. Connection 512 may be used to transfer information and commands between VCS 200 and SPCM 300 including, but not limited to, charge control, metering, and alarm information.

Communications network 500 may further comprise one or more communications link 513 between SPCM 300 and FMS 400. Connection 513 may comprise any suitable communications link known in the art. In an embodiment, connection 513 may comprise a cellular communications link, such as cellular 3G/4G, between communications device 352 of SPCM 300 and communications module 490 of FMS 400. Connection 513 may be used to transfer information and commands between SPCM 300 and FMS 400.

Communications network 500 may further comprise one or more communications link 514 between SPCM 300 and power source 120. Connection 514 may comprise any suitable communications link known in the art, and may be dependent upon that available at power source 120. In an embodiment, connection 514 may comprise a communications link, such as a wireless link, between communications module 350 and a locally mounted smart meter 331, which is in turn in communication with a utility operator. Useful charging information, such as charging status, charging current, percent charge complete, and desired time of charge completion, may be sent to utility operator via connection 514 to analyze customer usage profiles and feed back possible incentives. In another embodiment, a connection 514 may be achieved using a plug-in communications circuit card.

Figure 21:
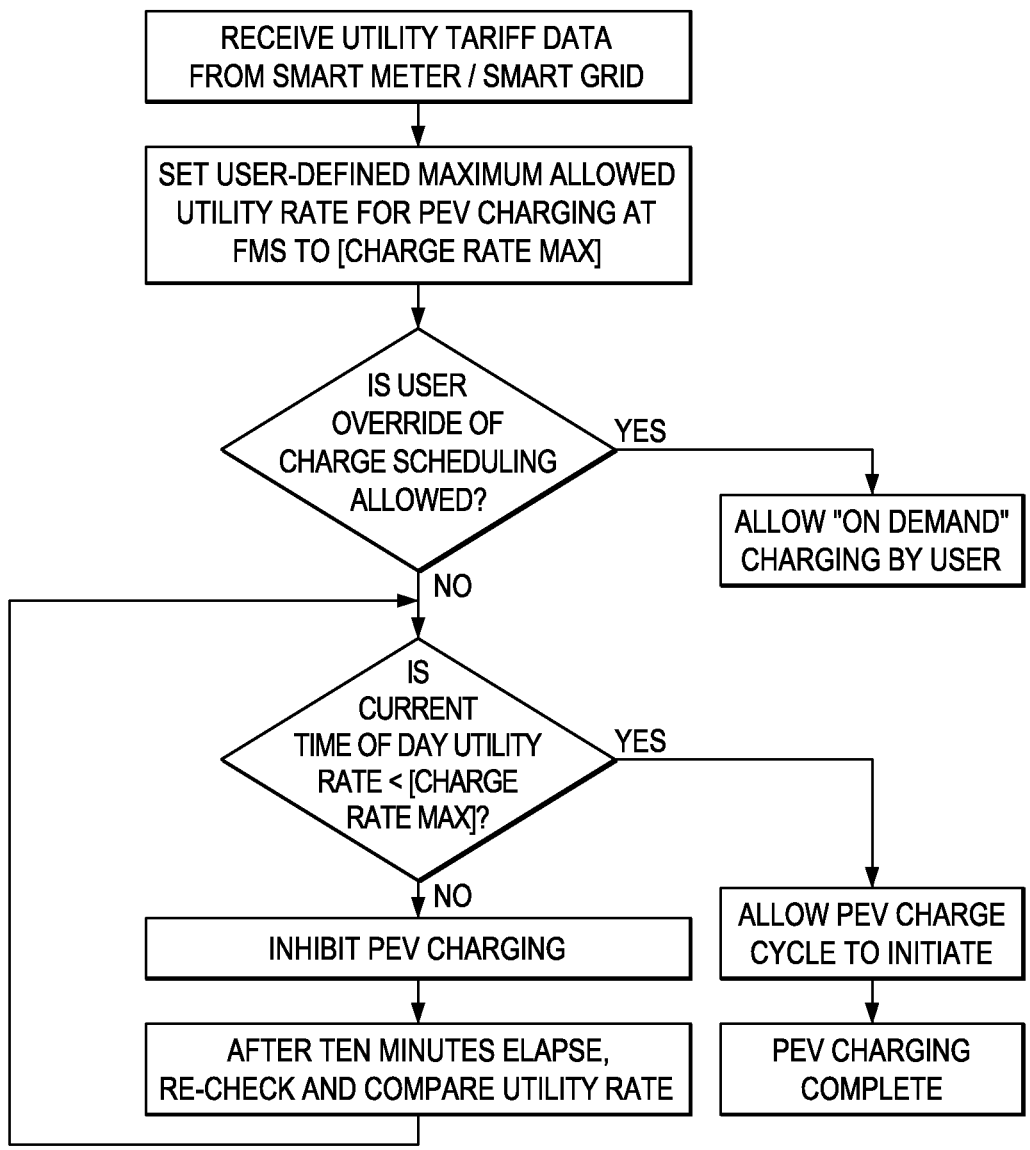
FIG. 21 depicts a flow chart of logic used to optimize charge time of day according to an embodiment of the present disclosure.

Referring to FIG. 21, in an embodiment, connection 514 may enable SPCM 300 to access and process utility rate data, and in turn schedule VCS 200 charge times based to minimize the energy costs. For example, SPCM 300 may schedule charge times to coincide with the times of day when utility rates are lower. In another embodiment, SPCM 300 may receive a charging deadline, and use rate information received via connection 514 to adjust charging time of day to meet both the deadline and achieve best case economy of utility tariffs. Referring back to FIG. 15, in yet another embodiment, FMS 400 may set usage profiles that enable or disable time of day charge schedules.

Figure 22:
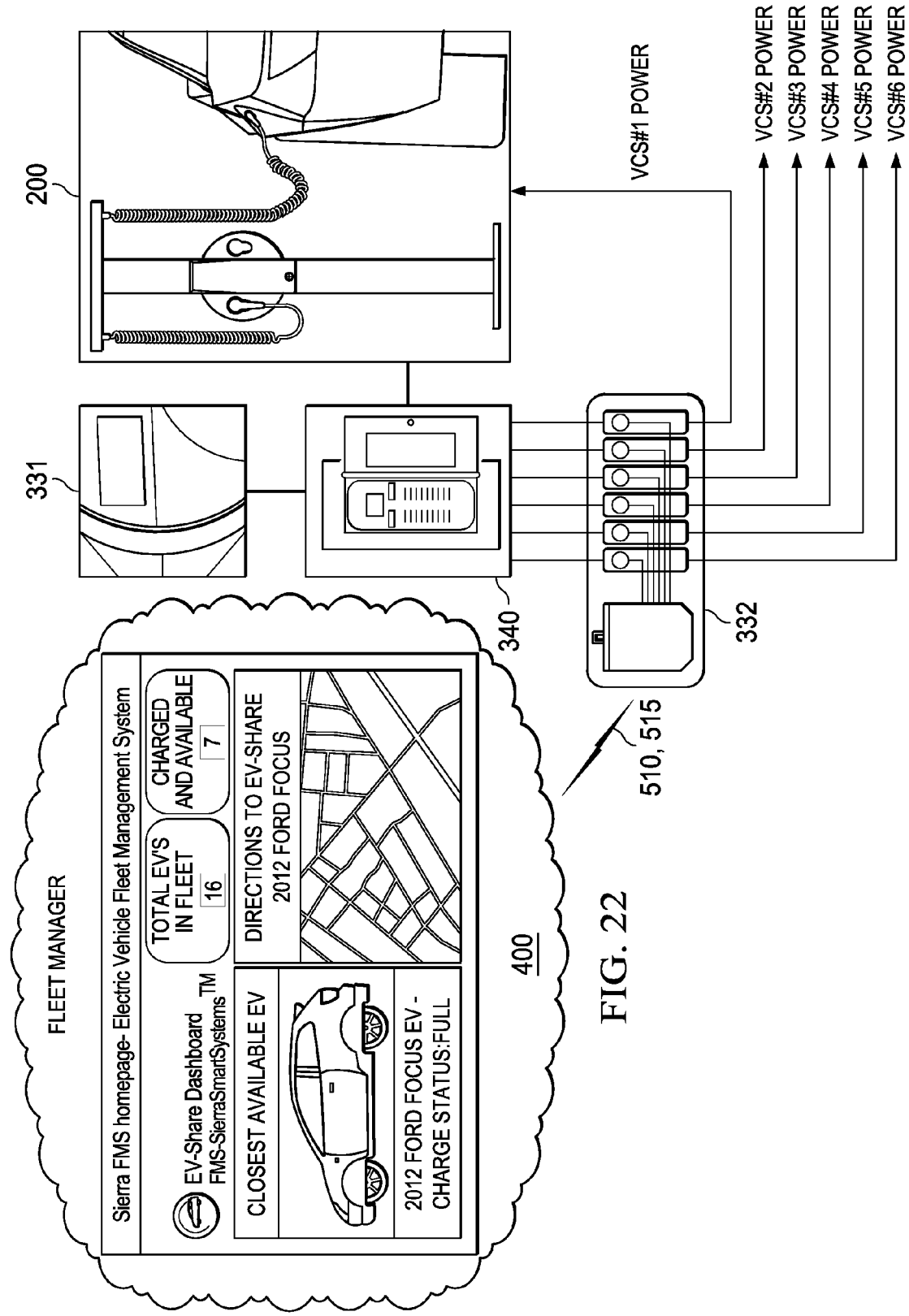
FIG. 22 depicts a schematic view of a communications link for metering power usage according to an embodiment of the present disclosure.

Referring to FIG. 22, communications network 500 may further comprise one or more communications links 515 for obtaining power usage data from utility operator and delivering it to FMS 400. In an embodiment, power usage data for each VCS 200 may be transmitted from a utility operator's database to FMS 400 by an internet connection 515 (not shown). In another embodiment, an optional sub-metering system 332 may monitor each feed to VCSs 200 and transmit the data wirelessly to FMS 400.

Figure 23:
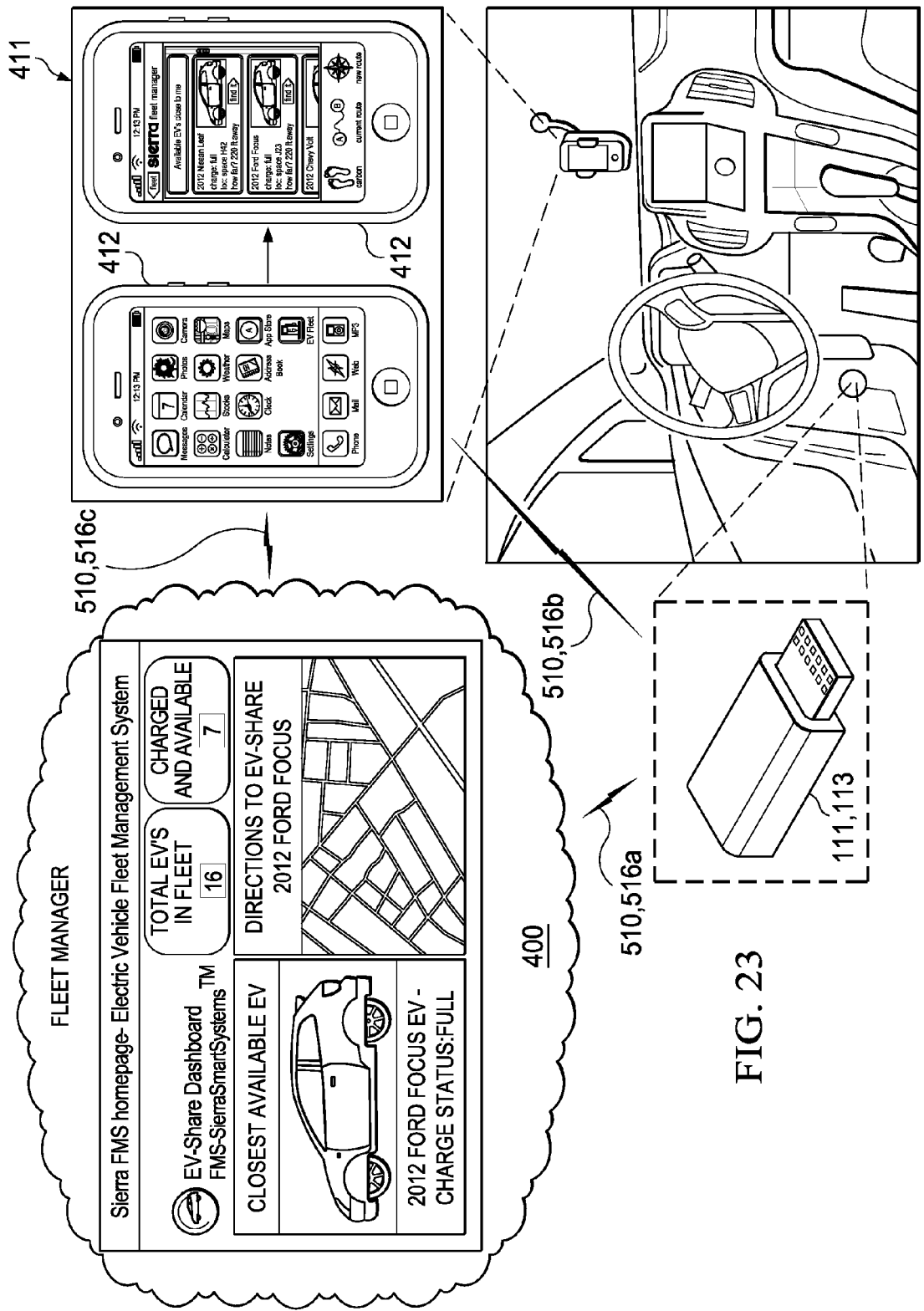
FIG. 23 depicts a schematic view of possible communications links between an EV-M, FMS, and smart device according to an embodiment of the present disclosure.

Referring to FIG. 23, communications network 500 may further comprise one or more communications links 516 between plug-in EV-M 113, FMS 400, and smart device 412. In an embodiment, a cellular 3G/4G connection 516a may link an on-board EV-M 113 directly with FMS 400. In another embodiment, a Wi-Fi connection 516b may link an on-board EV-M 113 with smart device 412. In yet another embodiment, a cellular 3G/4G connection 516c may link FMS 400 with smart device 412. Connections 516 may provide a seamless user experience, wherein EV-M may transmit electric vehicle 110 charge data, FMS 400 reports full fleet telematics (drive data, GPS, etc), automatic billing, and charge control, and smart device 412 may display electric vehicle 110 fleet status to an interested user. Portions of this data may also be provided to and displayed on the smart device app.

Power Architecture and Flow Management

Figure 24A:
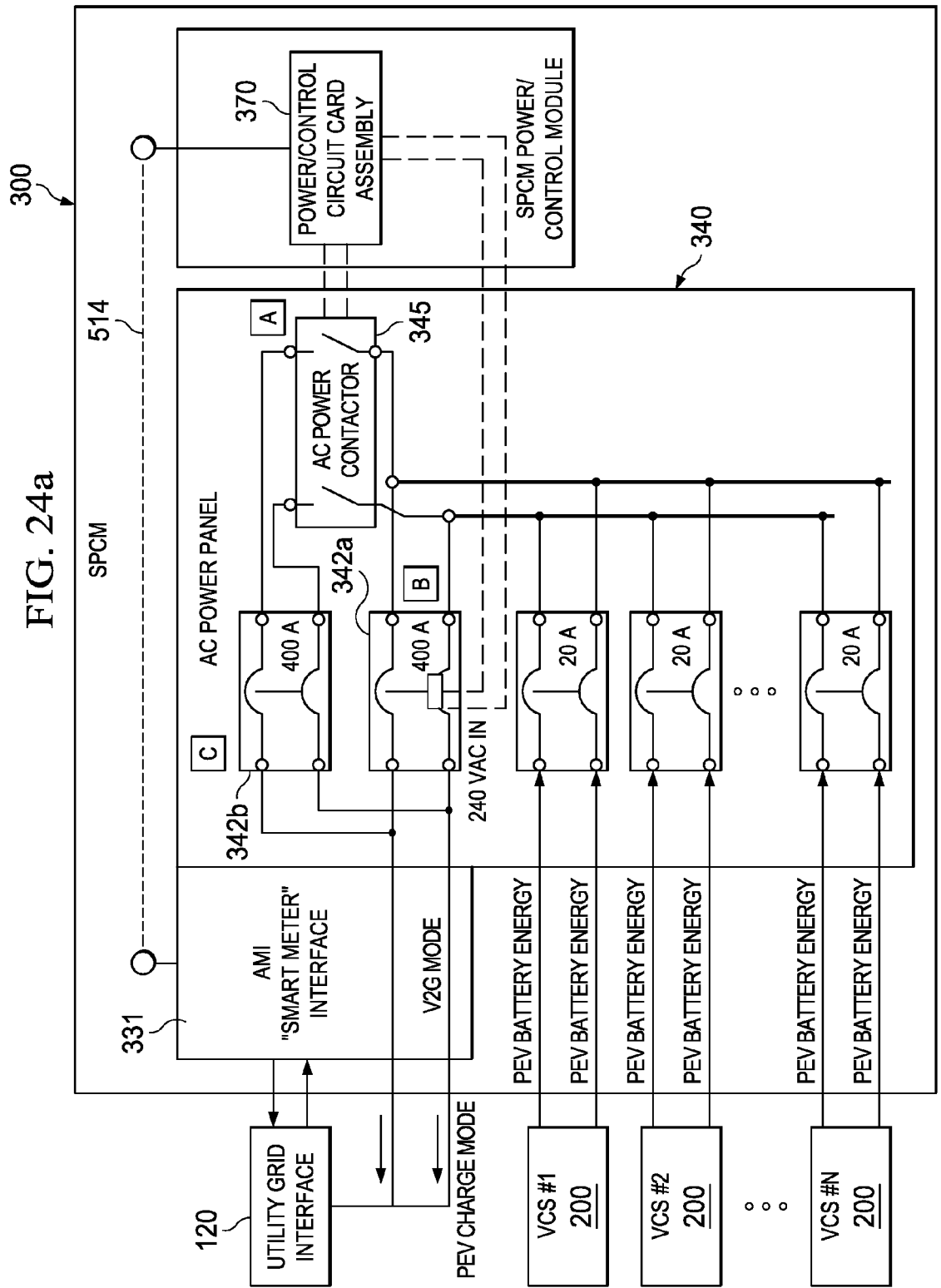
FIG. 24a depicts a schematic view of vehicle-to-grid power distribution according to an embodiment of the present disclosure.
Figure 24C:
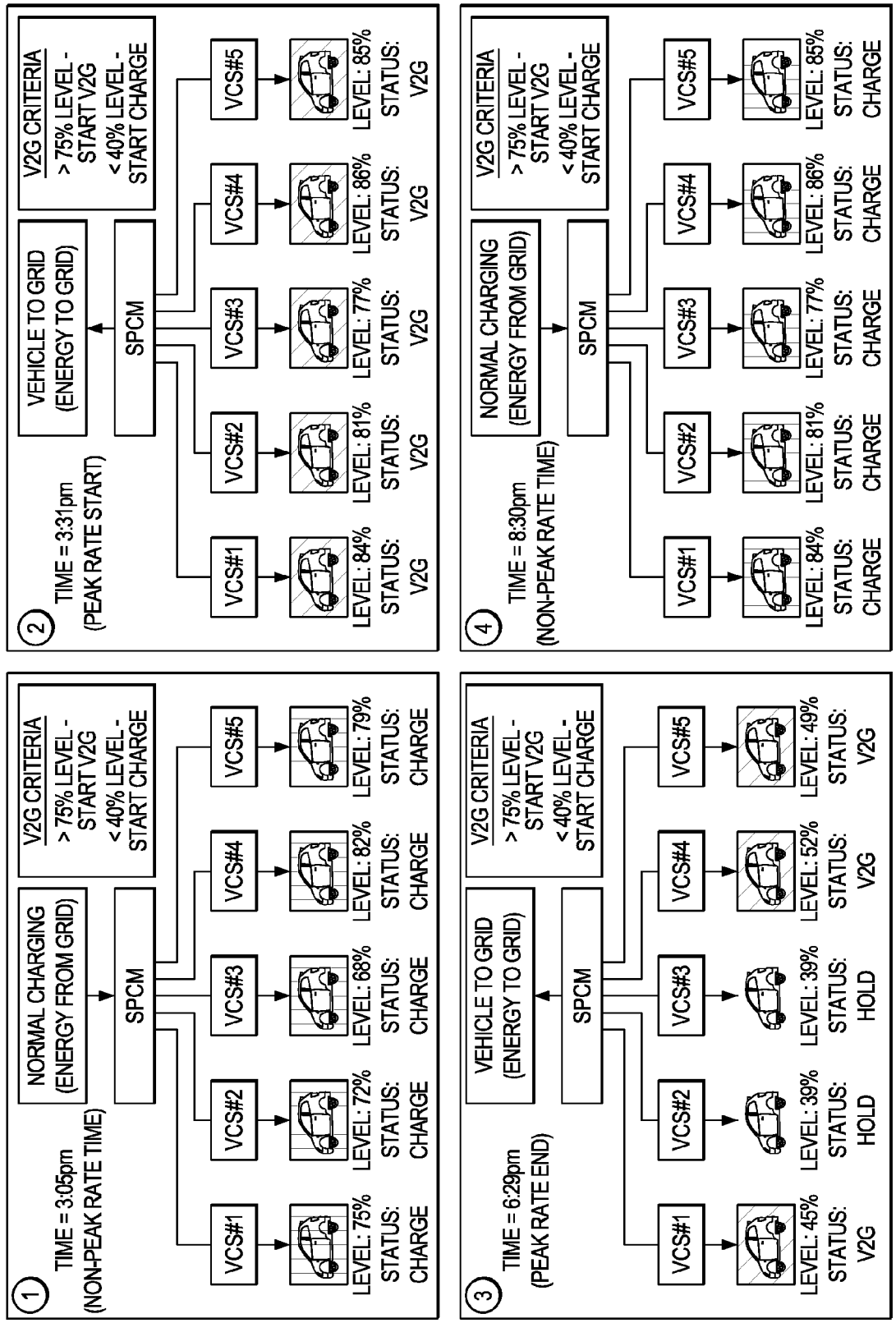
FIG. 24c depicts an illustrative view of using vehicle-to-grid functionality to take advantage of incentives from utility operators for reducing peak demand during peak hours according to an embodiment of the present disclosure.

Referring now to FIGS. 24a, electric vehicle charging system 100 may be configured to transfer stored energy to power source 120. For simplicity, this functionality will hereinafter be referred to as Vehicle-to-Grid ("V2G"). In an embodiment, system 100 has V2G functionality to transfer energy from electric vehicles 110 to a power source 120, such as the power grid. SPCM 300 may further comprise a communications and power distribution circuit card 370, and power panel 340 of SPCM 300 may further comprise a power switch (contactor) 345 and main circuit breakers 342a and 342b. On command, remote-controlled breaker 342a may disconnect the supply of energy from power source 120 to electric vehicles 110, and contactor 345 may reverse the power path such that it runs through breaker 342b. In an embodiment, SPCM 300 may communicate with each VCS 200 via connection to determine if each is connected to an electric vehicle 110 with stored energy that can be used in V2G applications. FMS 400 and SPCM 300 may comprise hardware/software functionality that monitors and controls charge status and charging operations, and user interface 410 may display available battery reserves to assist a user in effecting V2G operations as shown back in FIG. 24b. FIG. 24c depicts an illustrative use of V2G functionality to take advantage of incentives from utility operators for reducing demand during peak hours.

Figure 25A:
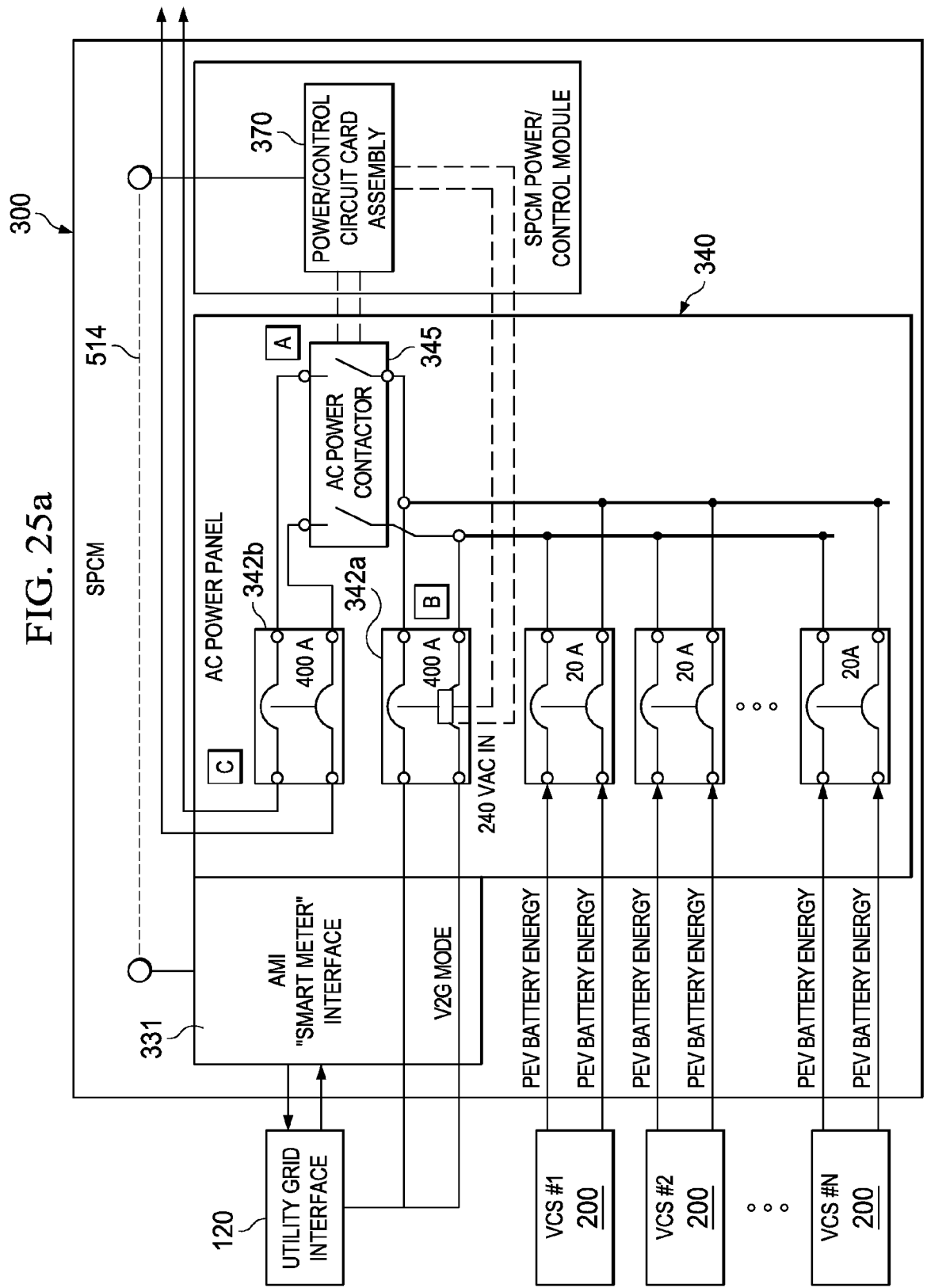
FIG. 25a depicts a schematic view of vehicle-to-fleet functionality for directing stored energy from the charging system to a fleet owner according to an embodiment of the present disclosure.
Figure 25B:
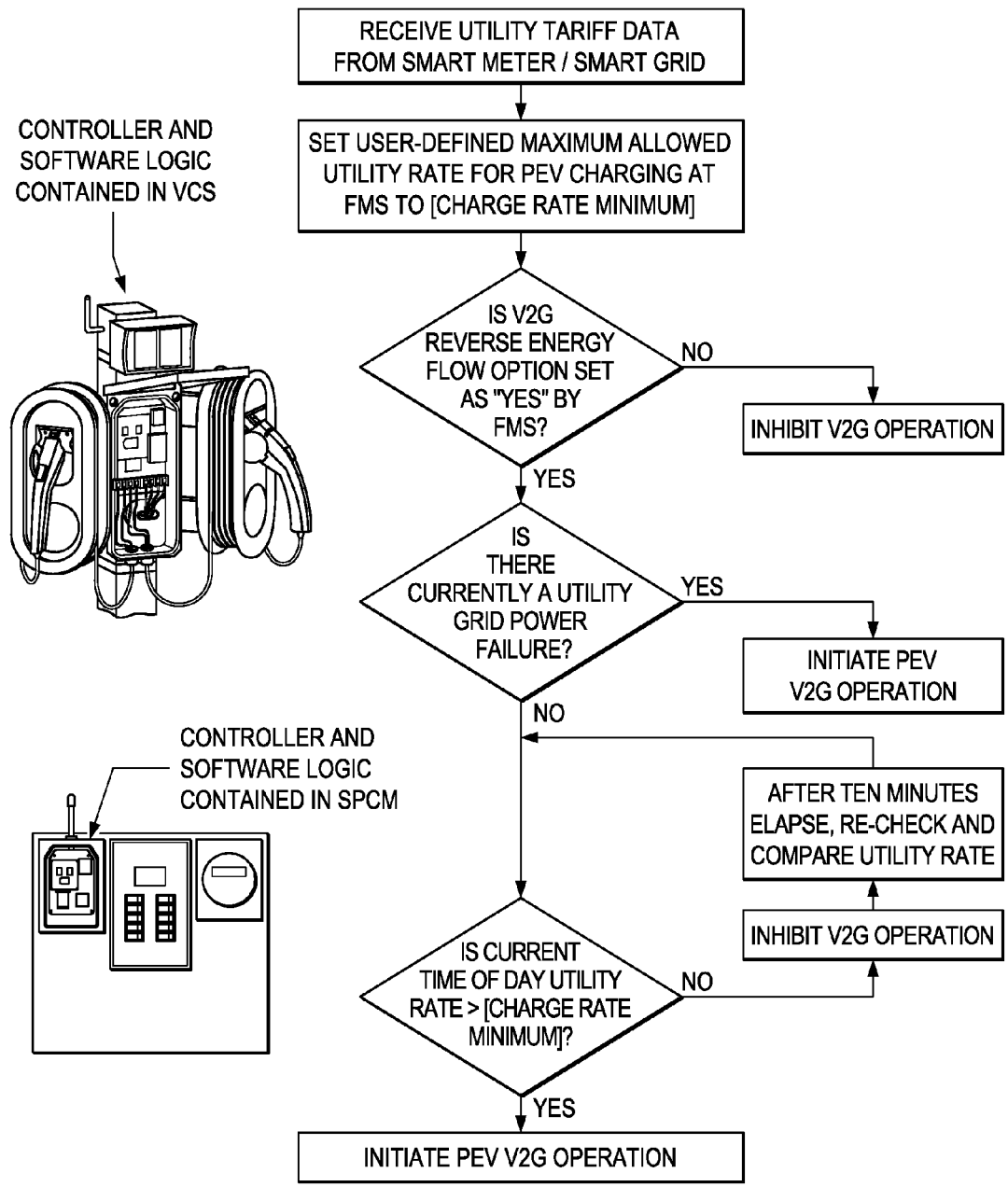
FIG. 25b depicts a flow chart of logic used to effect vehicle-to-grid backup power for a fleet owner according to an embodiment of the present disclosure.

Referring to FIG. 25a, V2G functionality may be modified to direct stored energy in system 100 to the fleet owner ("V2F"). In an embodiment, circuit breaker 342a may disconnect the energy supply from power source 120, and contactor 345 may direct the power path from electric vehicles 110 through a circuit breaker 342b to fleet owner. Some possible uses of this functionality include providing a power backup to the fleet owner in the event of power disruption from power source 120, and offering the fleet owner the alternative of using power stored in system 100 during peak hours, rather than consuming power from power source 120. A fleet owner may take advantage of this latter example to apply for incentives or grants from a utility operator for reducing its peak demand. FIG. 25b depicts logic that may be used in components of VCS 100 to govern V2G and V2F power management according to an embodiment of the present disclosure.

Figure 26:
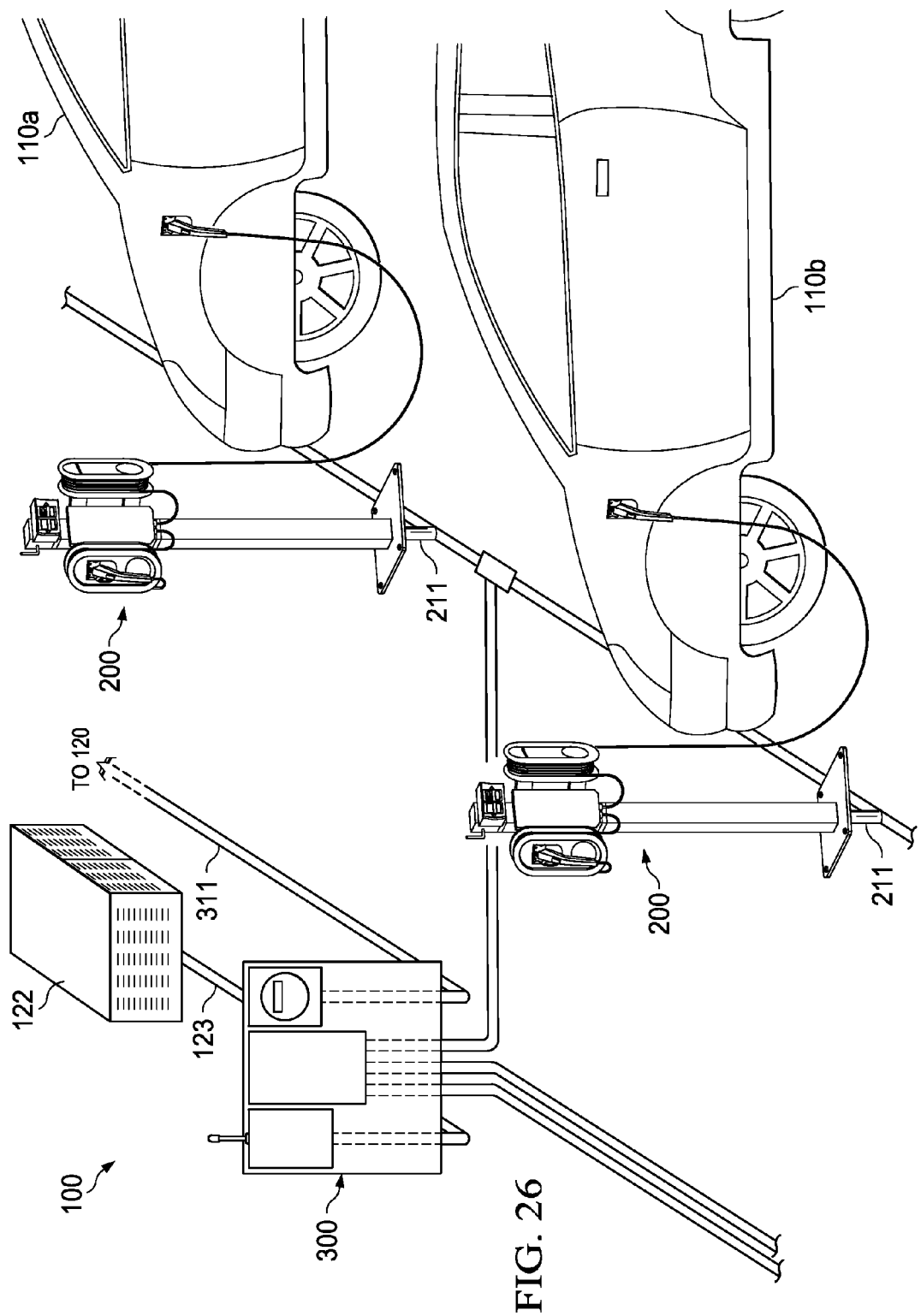
FIG. 26 depicts a perspective view of a possible configuration for directing electrical power from a backup power source to the charging system according to an embodiment of the present disclosure.

Referring to FIG. 26, system 100 may further comprise an interface to a backup power source 122. Backup power source 122 may feature any suitable power source. In an embodiment, backup power source 122 may comprise a generator or a fuel cell. A conduit 123 may transfer power from backup power source 122 to power input 310 of SPCM 300 (see FIG. 7), and may carry a startup signal from SPCM 300 to backup power source 122. Power panel 340 of SPCM 300 may comprise a relay circuit (not shown) for switching from power source 120 to backup power source 122. Communications and power distribution circuit module 370 (see FIG. 24a) may govern the interface with backup power source 122. Module 370 may sense a power fail condition, send a startup signal to the backup power source 122, and activate relay to switch power sources. Module 370 may reverse the process when normal power from power source 120 is restored.

Figure 27:
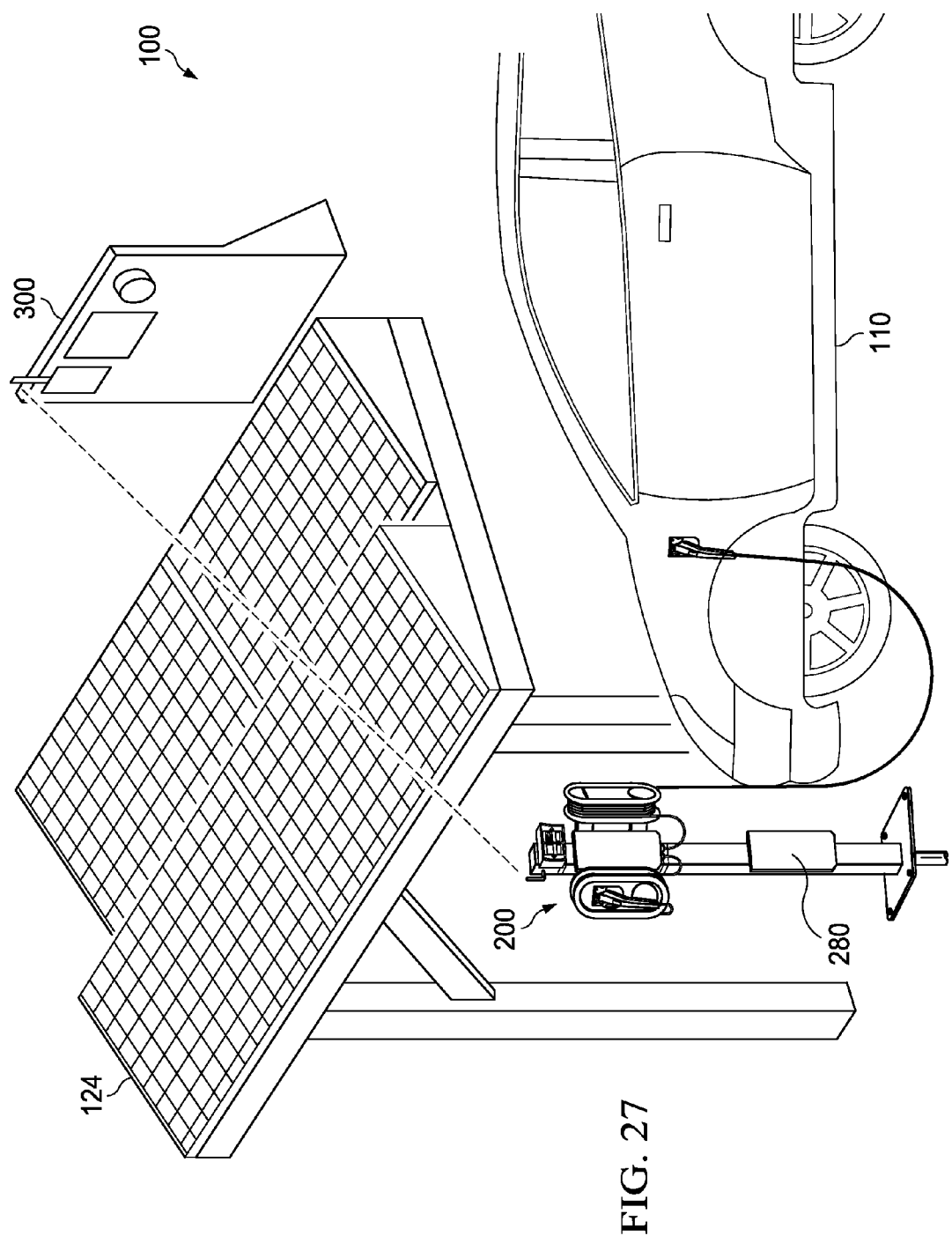
FIG. 27 depicts a perspective view of a supplemental power source for augmenting power in the charging system according to an embodiment of the present disclosure.

Referring now to FIG. 27, system 100 may comprise a supplemental power source 124. Supplemental power source 124 may comprise any suitable power source known in the art. In an embodiment, supplemental power source 124 may comprise one or more solar panels. In another embodiment, supplemental power source 124 may comprise one or more wind turbines. In an embodiment, supplemental power source 124 may be integrated into one or more VCS 200. Support structure 270 of VCS 200 may support both the VCS 200 and supplemental power source 124, or supplemental power source 124 may have its own support structure. VCS 200 may further comprise a Supplemental Power Module ("SPM") 280 to integrate power generated by supplemental power source 124 into charging system 100. SPM 280 may comprise a DC-AC power inverter for converting the current from supplemental power source 124 if necessary. SPM 280 may further comprise a charge circuit and a power bus for incorporating the generated power, thereby allowing it to augment or replace power from power source 120 when fed from SPCM 300 to each VCS 200. System 100 may further comprise an optional Supplemental Power Controller ("SPC") for monitoring and controlling the SPM 280. SPC may be integrated into SPCM 300, and may comprise a communications device, such as a Zigbee™ wireless device, for establishing a communications link between the SPC and the SPM 280. SPC further comprise a circuit card and may collect information regarding the amount of power generated by supplemental power source 124 and may communicate it to FMS 400. FMS 400 may report the supplemental power generation information and consider eventualities for its application within system 100. For example, the information could be used to identify grants, tax deductions, and other alternative energy financial incentives. Energy generated from supplemental power source 124 may also be directed to power source 120 in a similar manner as that described for V2G operations.

Figure 28B:
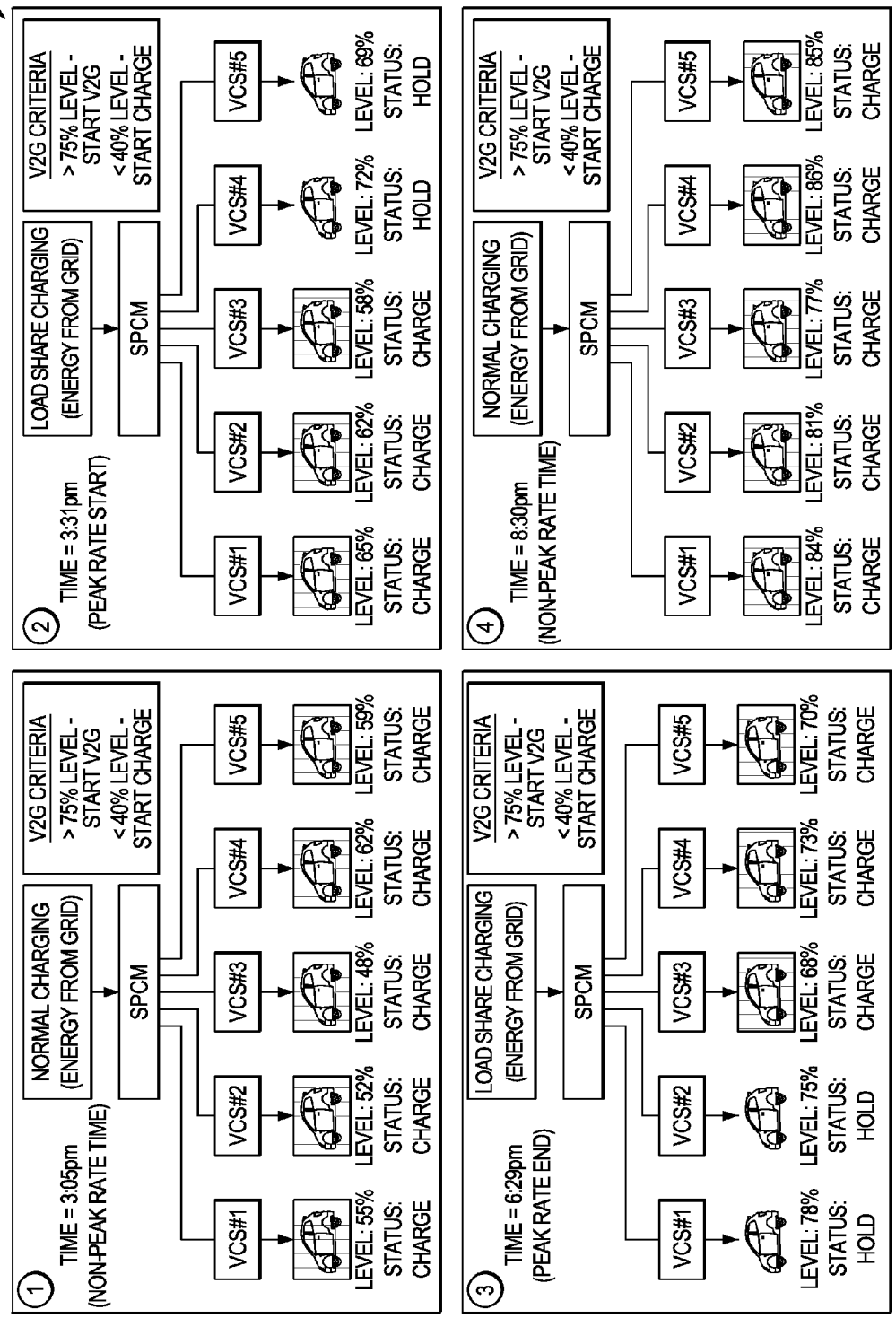
FIG. 28b depicts a schematic view of the logic of FIG. 28a in a vehicle fleet according to an embodiment of the present disclosure.

Referring to FIGS. 28*a* and 28*b*, system 100 may be configured to provide optimal load balancing and rotation of charge cycles as a function of utility tariffs, grid demand, and fleet demand. In an embodiment, FMS 400 may comprise a software algorithm that logically considers factors such as charge status, charge level, time of day, desired charge completion time, and utility tariffs to determine optimum load balancing on the charge system and rotation of VCS charge allocations. FIG. 28*a* depicts logic that may be used by FMS 400 to govern load balancing and charging cycle rotation according to an embodiment of the present disclosure. FIG. 28*b* depicts an illustrative use of such functionality in system 100 to balance loads and charge cycles during peak energy rate time of day.

System 100 may support multiple charging profiles. Charging profiles may be selected via user interface 250 at VCS 200, or may be directed via or set within FMS 400 by a fleet manager with pre-set system administrative privileges. In an embodiment, a fast or "on-demand" charging profile may instruct that the charging cycle begin immediately upon request and continue a full requested current until complete. In another embodiment, an "economy" profile may be selected, wherein the user may specify a desired charging time, and the charging profile determines optimal charging operations to best meet both the charging time and utilize the lowest utility rates available.

Locations of SPCM 300 and VCS 200 may be identified using cellular site triangulation or global positioning system ("GPS"). In an embodiment, SPCM 300 and VCS 200 may contain wireless communication equipment and hardware/software to analyze and report location. In another embodiment, SPCM 300 and VCS 200 may contain hardware and software that allow GPS location coordinates to be entered and stored into memory. In yet another embodiment, SPCM 300 and VCS 200 GPS coordinates may be transmitted to a utility grid operator, enabling grid operator to distribute and optimize grid power distribution, and/or optimize time of day charging for local peak demand shaving and/or charge cost reduction. In various embodiments, the identified location of VCS 200 may be transmitted via a wireless text message or a smartphone application interface service to drivers of passing electric vehicles 110 to notify them of the availability and location of the VCS 200. In still another embodiment, VCS 200 may comprise the capability to transmit a GPS location "beacon" to indicate proximity of the VCS 200 to passing electric vehicles 110 having GPS function.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for managing a plurality of electric vehicles, the system comprising:
   a plug-in module that connects to an on-board computer system of at least one of the plurality of electric vehicles, the plug-in module configured to collect and store data collected from the at least one of the plurality of electric vehicles in real-time while the at least one of the plurality of electric vehicles is in operation;
   a first software application that manages, monitors, and controls electric vehicle driver registrations, rental checkouts, rental returns, billing, costs, carbon emissions, and additional parameters associated with the plurality of electric vehicles;
   a second software application that executes on a smart device, the second software application comprising a user interface for displaying electric vehicle driver registrations, rental checkouts, rental returns, billing, costs, carbon emissions, and additional parameters associated with the plurality of electric vehicles;

a communications network to communicate among the plug-in module, the first software application, the smart device executing the second software application and a utility providing electric vehicle charging energy, the communications network having a first communications link between the plug-in module and the first software application, a second communications link between the first software application and the smart device executing the second software application, a third communications link between the smart device executing the second software application and the plug-in module, and a fourth communications link between the first software application and the utility providing electric vehicle charging energy; and a non-transitory computer-readable medium residing in the plug-in module that stores computer executable instructions supporting the system, the computer-executable instructions comprising computer code that extracts information items from the one or more of the plurality of electric vehicles in real-time, wirelessly transmits the information items to the first software application, and wirelessly transmits the information items to the smart device executing the second software application.

2. The system of claim 1 wherein each of the first, second, third and fourth communications links communicates wirelessly.

3. The system of claim 1 wherein each of the first, second, and third communications links communicates wirelessly and the fourth communications link communicates over an Internet wire line connection.

4. The system of claim 1, the computer-executable instructions further comprising:
code that calculates energy usage metrics for the one or more of the plurality of electric vehicles.

5. The system of claim 4 wherein the code calculates energy usage metrics using vehicle charge energy data extracted by the plug-in module and utility-supplied energy amounts extracted by the computer-executable instructions from the system for the one or more of the plurality of electric vehicles.

6. The system of claim 1, the computer-executable instructions further comprising:
code that calculates energy cost per mile usage metrics for the one or more of the plurality of electric vehicles.

7. The system of claim 6 wherein the code calculates energy cost per mile usage metrics using vehicle mileage and charge energy data extracted by the plug-in module and utility-supplied energy costs extracted by the computer-executable instructions from the system for the one or more of the plurality of electric vehicles.

8. The system of claim 1 wherein the data about the at least one of the plurality of electric vehicles collected and stored by the plug-in module is vehicle odometer reading, vehicle speed, battery charge level and driver handling data.

9. The system of claim 1 wherein the information items are availability of one or more of the plurality of electric vehicles, location relative to the smart device of an available one or more of the plurality of electric vehicles, distance to the available one or more of the plurality of electric vehicles, charge status of the available one or more of the plurality of electric vehicles, energy cost per mile for the available one or more of the plurality of electric vehicles, scheduled maintenance for the one or more of the plurality of electric vehicles, usage and handling metrics for a driver of one of the plurality of electric vehicles, average miles driven between charges for the one or more of the plurality of electric vehicles, carbon emissions, odometer readings for one or more of the plurality of electric vehicles, battery charge level for one or more of the plurality of electric vehicles, vehicle alarm status and maintenance alerts.

10. A non-transitory computer-readable medium residing in a software system, wherein the non-transitory computer readable medium stores computer-executable instructions that support a management system for a plurality of electric vehicles, the computer-executable instructions comprising computer code performing steps of:

extracting information in real-time, while the plurality of electric vehicles are in operation, from the management system about at least one characteristic of one or more of the plurality of electric vehicles, the at least one characteristic selected from a group consisting of: odometer reading, battery charge level, alarm status, maintenance alerts, driver handling data, energy cost per mile, carbon emission reductions, and average miles driven between charges;

extracting information from a providing electric utility about:
(1) a total amount of energy provided to charge the one or more of the plurality of electric vehicles,
(2) a type of energy being provided by a supplemental power source to charge the one or more of the plurality of electric vehicles, the supplemental power source selected from a group comprising: solar power, wind power, and other renewable energy power types,
(3) a percent of each type of energy being provided by the supplemental power source to comprise the total amount of energy provided for charging the one or more of the plurality of electric vehicles, and
(4) a tariffed rate of the total amount of energy provided to charge the one or more of the plurality of electric vehicles;

organizing the information into a desired format; and
displaying the information via a user interface.

11. The non-transitory computer-readable medium of claim 10, the computer code further performing a step of:
using the information from the providing electric utility to calculate and report the type of energy being provided by the supplemental power source to charge the one or more of the plurality of electric vehicles and the percent of each type of energy being provided by the supplemental power source to comprise the total amount of energy provided for charging the one or more of the plurality of electric vehicles.

12. The non-transitory computer-readable medium of claim 10, the computer code further performing a step of:
calculating carbon emission avoidance achieved by driving one or more of the plurality of electric vehicles charged with the supplemental power source, based on the type of supplemental power source, selected from the group comprising: solar power, wind power, and other renewable energy power types.

13. The non-transitory computer-readable medium of claim 12 wherein the carbon emission avoidance calculations are applied to a specific one of the plurality of electric vehicles.

14. The non-transitory computer-readable medium of claim 12 wherein the carbon emission avoidance calculations are applied to a specific fleet of the plurality of electric vehicles.

15. The non-transitory computer-readable medium of claim 12, the computer code further performing a step of:

calculating carbon emission avoidance achieved by a specific driver using one of the plurality of electric vehicles charged with the supplemental power source.

16. The non-transitory computer-readable medium of claim 10, the computer code further performing a step of:
selecting and displaying carbon emission avoidance on a smart device of a specific driver using one of the plurality of electric vehicles charged with the supplemental power source.

17. The non-transitory computer-readable medium of claim 10, the computer code further performing a step of:
selecting and displaying carbon emission avoidance achieved by a specific fleet of the plurality of electric vehicles charged with the supplemental power source.

18. The non-transitory computer-readable medium of claim 10, the computer code further performing a step of:
selecting and displaying carbon emission avoidance data as a function of time of day and power utility operating parameters.

19. The non-transitory computer-readable medium of claim 18 wherein the time of day and utility operating parameters comprise:
energy type changes that occur during peak usage times.

\* \* \* \* \*